US012677227B2

(12) United States Patent
Jeon et al.

(10) Patent No.: US 12,677,227 B2
(45) Date of Patent: Jul. 7, 2026

(54) METHOD FOR PERFORMING FEDERATED LEARNING IN WIRELESS COMMUNICATION SYSTEM, AND APPARATUS THEREFOR

(71) Applicant: LG Electronics Inc., Seoul (KR)

(72) Inventors: Kijun Jeon, Seoul (KR); Sangrim Lee, Seoul (KR); Ikjoo Jung, Seoul (KR); Hojae Lee, Seoul (KR); Yeongjun Kim, Seoul (KR); Taehyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 18/294,877

(22) PCT Filed: Aug. 3, 2021

(86) PCT No.: PCT/KR2021/010160
§ 371 (c)(1),
(2) Date: Feb. 2, 2024

(87) PCT Pub. No.: WO2023/013795
PCT Pub. Date: Feb. 9, 2023

(65) Prior Publication Data
US 2025/0008449 A1    Jan. 2, 2025

(51) Int. Cl.
*H04W 52/32*     (2009.01)
*H04L 1/00*      (2006.01)
*H04L 41/16*     (2022.01)

(52) U.S. Cl.
CPC ......... *H04W 52/325* (2013.01); *H04L 1/0063* (2013.01); *H04L 41/16* (2013.01)

(58) Field of Classification Search
CPC ....... H04L 1/0041; H04L 1/0057; H04L 1/00; H04L 1/0009; H04L 1/0042;
(Continued)

(56) References Cited

U.S. PATENT DOCUMENTS

| | | | | |
|---|---|---|---|---|
| 2008/0168320 A1* | 7/2008 | Cassuto | ............. | G06F 11/1068 714/E11.038 |
| 2008/0282132 A1* | 11/2008 | Egner | .................. | H03M 13/19 714/E11.034 |
| 2021/0119713 A1 | 4/2021 | O'Shea et al. | | |

FOREIGN PATENT DOCUMENTS

| | | |
|---|---|---|
| CN | 105323842 A | 2/2016 |
| KR | 10-2005-0042717 | 5/2005 |

(Continued)

OTHER PUBLICATIONS

Jang, "Retransmission Scheme with Equal Combined Power Allocation Using Decoding Method with Improved Convergence Speed in LDPC Coded OFDM Systems," The Journal of Korean Institute of Communications and Information Sciences, 2013, 38(9):750-8 (with English Abstract).

(Continued)

*Primary Examiner* — Ajibola A Akinyemi
(74) *Attorney, Agent, or Firm* — Fish & Richardson P.C.

(57)                    ABSTRACT

Proposed are a method for performing federated learning in a wireless communication system, and an apparatus therefor. The method performed by a terminal may comprise the steps of: generating a Q-ary code including i) a restriction-based system part and ii) a parity part by coding restriction-based Q-ary information; determining, on the basis of a preset method, the number T of transmissions of the parity part of the Q-ary code; on the basis of specific channel information from among channel information between a plurality of terminals and a base station participating in the federated learning, allocating power to the system part and T parity parts; and transmitting, on the basis of the allocated power, the system part and the T parity parts to the base station.

13 Claims, 18 Drawing Sheets

(58) Field of Classification Search
    CPC . H04L 1/0058; H04L 1/0068; H04L 27/3411;
        H04L 41/16; H04L 1/0003; H04L 1/0045;
        H04L 1/0061; H04L 1/0063; H04L 1/08
    USPC ........................................................ 455/522
    See application file for complete search history.

(56)                  References Cited

FOREIGN PATENT DOCUMENTS

KR      10-2008-0092801      10/2008
WO      WO 2004/077778       9/2004

OTHER PUBLICATIONS

Lata, "On [31, 28, 3] Hamming Code and [7, 4, 4] MDS Code Over GF(5)," Global Journal of Pure and Applied Mathematics, 13(9):5461-5468.

Huang et al., "Physical-Layer Arithmetic for Federated Learning in Uplink MU-MIMO Enabled Wireless Networks," Paper, Presented at the Proceedings of the IEEE INFOCOM 2020—IEEE Conference on Computer Communications, Toronto, Canada, Jul. 6-9, 2020, 10 pages.

Notice of Allowance in Korean Appln. No. 10-2024-7005619, mailed on Aug. 19, 2025, 5 pages (with English translation).

Extended European Search Report in European Appln. No. 21952917.9, mailed on Apr. 17, 2025, 7 pages.

Kim et al., "Deepcode: Feedback Codes via Deep Learning," IEEE Journal on Selected Areas in Information Theory, May 2020, 1(1):194-206.

Office Action in Chinese Appln. No. 202180101194.2, mailed on May 18, 2026, 15 pages (with English translation).

* cited by examiner

FIG. 4

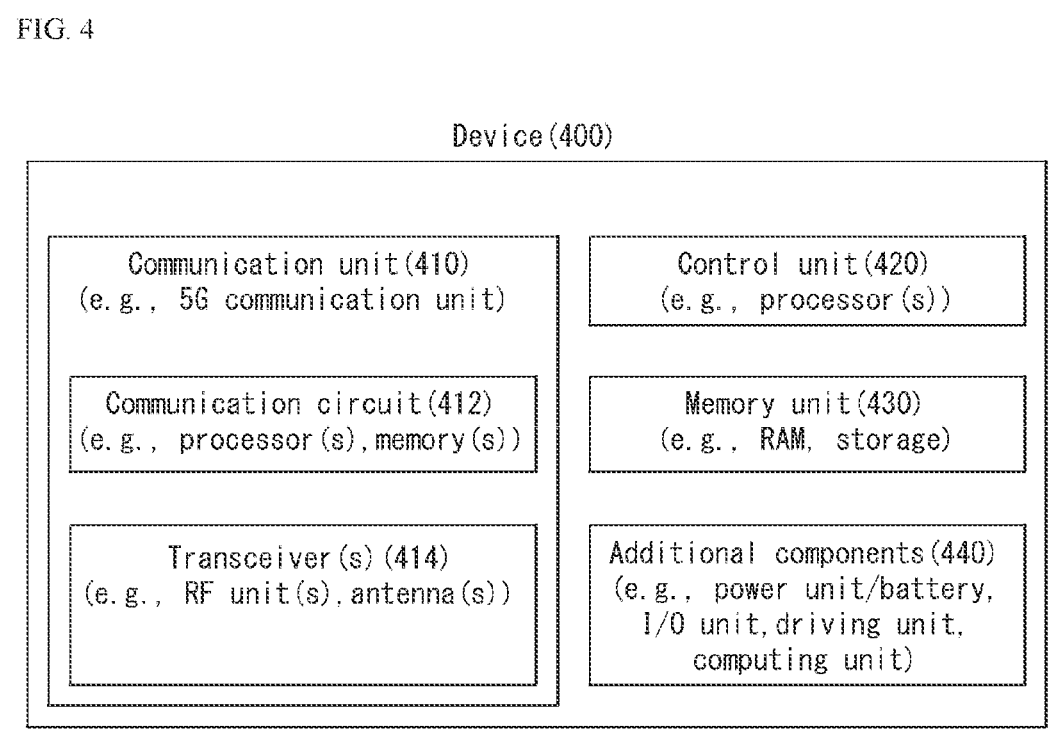

Device(400)

Communication unit(410)
(e.g., 5G communication unit)

Control unit(420)
(e.g., processor(s))

Communication circuit(412)
(e.g., processor(s),memory(s))

Memory unit(430)
(e.g., RAM, storage)

Transceiver(s)(414)
(e.g., RF unit(s),antenna(s))

Additional components(440)
(e.g., power unit/battery,
I/O unit,driving unit,
computing unit)

| Time point | Input sequence |
|---|---|
| 1 | $(x_1^{(1)}, x_2^{(1)} \cdots, x_d^{(1)})$ |
| 2 | $(x_1^{(2)}, x_2^{(2)} \cdots, x_d^{(2)})$ |
| 3 | $(x_1^{(3)}, x_2^{(3)} \cdots, x_d^{(3)})$ |
| $t$ | $(x_1^{(t)}, x_2^{(t)} \cdots, x_d^{(t)})$ |
| $T$ | $(x_1^{(T)}, x_2^{(T)} \cdots, x_d^{(T)})$ |

(a)

(b)

Systematic          Parity

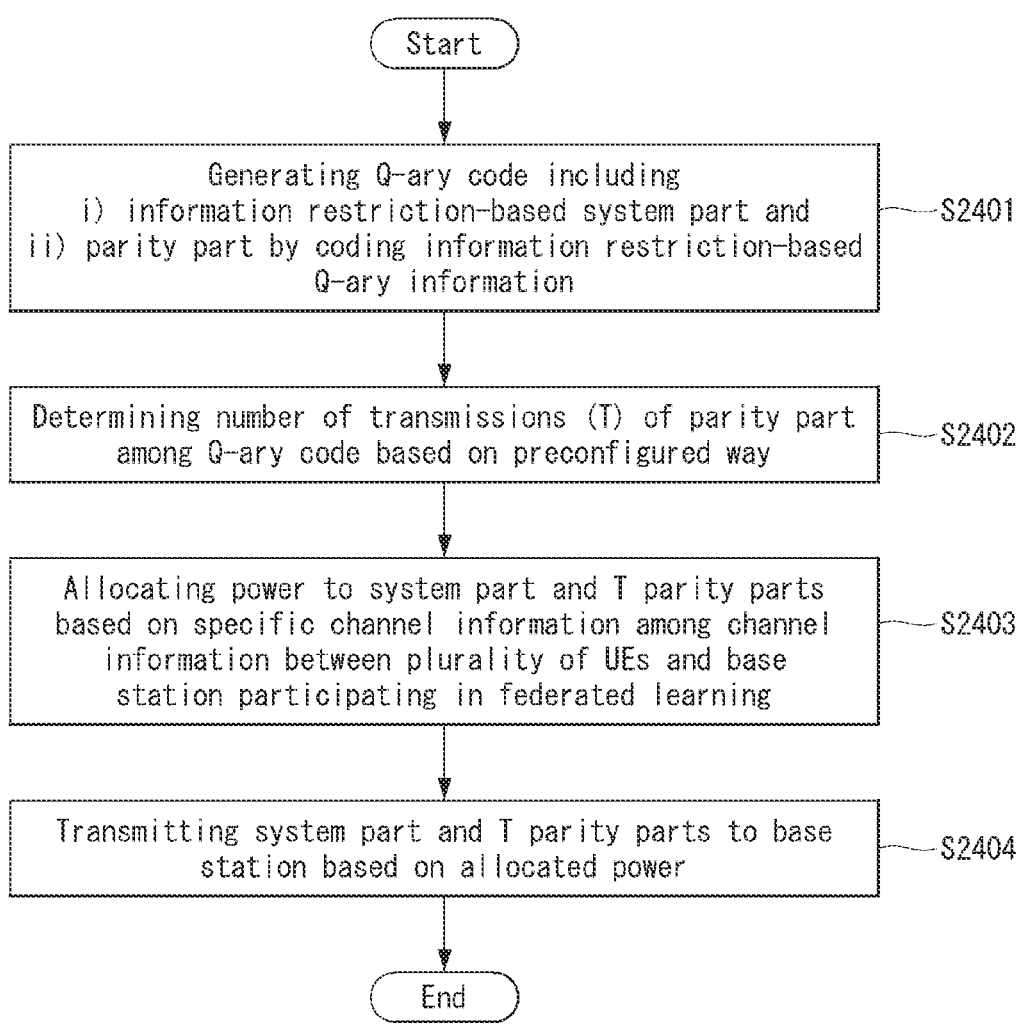

```
                        ┌─────────┐
                        │  Start  │
                        └─────────┘
                             │
                             ▼
┌──────────────────────────────────────────────────────┐
│              Generating Q-ary code including           │
│   i) information restriction-based system part and     │── S2401
│ ii) parity part by coding information restriction-based│
│                  Q-ary information                     │
└──────────────────────────────────────────────────────┘
                             │
                             ▼
┌──────────────────────────────────────────────────────┐
│ Determining number of transmissions (T) of parity part│── S2402
│       among Q-ary code based on preconfigured way      │
└──────────────────────────────────────────────────────┘
                             │
                             ▼
┌──────────────────────────────────────────────────────┐
│    Allocating power to system part and T parity parts  │
│  based on specific channel information among channel   │── S2403
│       information between plurality of UEs and base     │
│     station participating in federated learning        │
└──────────────────────────────────────────────────────┘
                             │
                             ▼
┌──────────────────────────────────────────────────────┐
│   Transmitting system part and T parity parts to base  │── S2404
│          station based on allocated power              │
└──────────────────────────────────────────────────────┘
                             │
                             ▼
                        ┌─────────┐
                        │   End   │
                        └─────────┘
```

FIG. 25

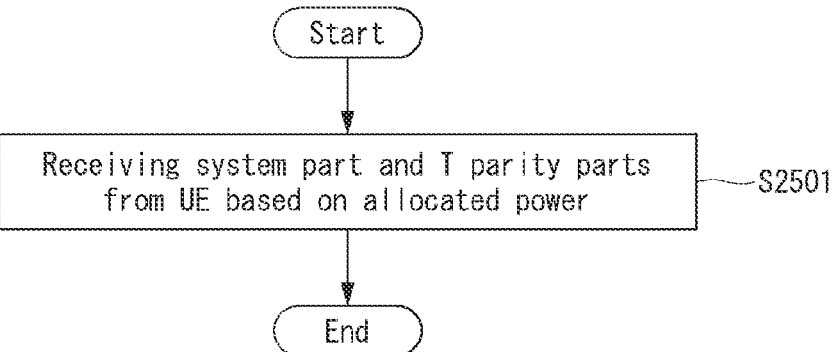

```
                   ┌─────────┐
                   │  Start  │
                   └─────────┘
                        │
                        ▼
┌──────────────────────────────────────────┐
│   Receiving system part and T parity parts │── S2501
│        from UE based on allocated power    │
└──────────────────────────────────────────┘
                        │
                        ▼
                   ┌─────────┐
                   │   End   │
                   └─────────┘
```

1

METHOD FOR PERFORMING FEDERATED LEARNING IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2021/010160, filed on Aug. 3, 2021. The disclosure of the prior application is incorporated by reference in its entirety.

TECHNICAL FIELD

The present disclosure relates to a wireless communication system, and more specifically, to a method for performing federated learning and an apparatus that supports the same.

BACKGROUND ART

Not only are wireless communication systems widely deployed to provide various types of communication services such as voice and data, but attempts to incorporate artificial intelligence (AI) into communication systems are rapidly increasing.

AI integration methods that are being attempted can be roughly divided into C4AI (communications for AI), which develops communication technology to support AI, and AI4C (AI for communications), which utilizes AI to improve communication performance.

In the AI4C field, there are attempts to increase design efficiency by replacing channel encoders/decoders with end-to-end autoencoders.

In the C4AI field, there is a method of updating common prediction models while protecting personal information by sharing only the model's weight or gradient with the server without sharing raw data between devices with federated learning, which is a distributed learning technique. Additionally, there are a method of distributing load on devices, network edges, and cloud servers through split inference.

DISCLOSURE

Technical Problem

The present disclosure proposes a method for performing power allocation and/or resource management using restriction-based scalable Q-ary linear code in AirComp-based federated learning, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method for performing federated learning in a wireless communication system. The method performed by a user equipment (UE) may comprise generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in the federated learning, and transmitting the system part and the T parity parts to the base station based on the allocated power.

In addition, in the method of the present disclosure, the number of transmissions (T) may be determined based on available resources.

In addition, in the method of the present disclosure, a maximum number of the transmissions of the parity part may be determined based on a Q-ary related value and a restriction-based Q-ary related value.

In addition, in the method of the present disclosure, the restriction-based Q-ary related value may be determined based on at least one of channel state and/or a number of the plurality of UES.

In addition, in the method of the present disclosure, the system part may be modulated based on a modulation order different from the parity part.

In addition, in the method of the present disclosure, the present disclosure may further comprise receiving the specific channel information from the base station, wherein the specific channel information may be information about a channel with highest noise among channels between the plurality of UEs and the base station.

In addition, a user equipment (UE) configured to perform federated learning in a wireless communication system of the present disclosure, the UE may comprise at least one transceiver, at least one processor functionally connected to the at least one transceiver, and at least one memory functionally connected to the at least one processor, and storing instructions for causing the at least one processor to perform operations, wherein the operations may include generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in the federated learning, and transmitting the system part and the T parity parts to the base station based on the allocated power.

In addition, a method for performing federated learning in a wireless communication system of the present disclosure, the method performed by a base station may comprise receiving a system part and T parity parts from a user equipment (UE) based on allocated power, wherein the system part and parity parts may be generated by coding restriction-based Q-ary information, wherein a number of transmissions (T) of the parity part may be determined based on a preconfigured way, and wherein the allocated power of the system part and T parity parts may be determined based on specific channel information among channel information between a plurality of UEs and a base station participating in the federated learning.

In addition, in the method of the present disclosure, the number of transmissions (T) may be determined based on available resources.

In addition, in the method of the present disclosure, a maximum number of the transmissions of the parity part may be determined based on a Q-ary related value and a restriction-based Q-ary related value.

In addition, in the method of the present disclosure, the restriction-based Q-ary related value may be determined based on at least one of channel state and/or a number of the plurality of UEs.

In addition, in the method of the present disclosure, the system part may be modulated based on a modulation order different from the parity part.

In addition, in the method of the present disclosure, the present disclosure may further comprise transmitting the specific channel information to the UE, wherein the specific channel information may be information about a channel with highest noise among channels between the plurality of UEs and the base station.

In addition, a base station configured to perform federated learning in a wireless communication system of the present disclosure, the base station may comprise at least one transceiver, at least one processor functionally connected to the at least one transceiver, and at least one memory functionally connected to the at least one processor, and storing instructions for causing the at least one processor to perform operations, wherein the operations may include receiving a system part and T parity parts from a user equipment (UE) based on allocated power, wherein the system part and parity part may be generated by coding restriction-based Q-ary information, wherein a number of transmissions (T) of the parity part may be determined based on a preconfigured way, and wherein the allocated power of the system part and T parity parts may be determined based on specific channel information among channel information between a plurality of UEs and a base station participating in the federated learning.

In addition, a processor apparatus configured to control a user equipment (UE) to perform federated learning in a wireless communication system of the present disclosure, the processor apparatus may comprise at least one processor, and at least one memory functionally connected to the at least one processor, and storing instructions for causing the at least one processor to perform operations, wherein the operations may include generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in the federated learning, and transmitting the system part and the T parity parts to the base station based on the allocated power.

In addition, a computer readable medium (CRM) storing instructions for causing at least one processor of the present disclosure to perform operations, wherein the operations may include generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in federated learning, and transmitting the system part and the T parity parts to the base station based on the allocated power.

Advantageous Effects

According to the present disclosure, there is an effect capable of efficiently using power and resources by performing power allocation and/or resource management using restriction-based scalable Q-ary linear code in AirComp-based federated learning.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 4 is a view showing another example of a wireless device applicable to the present disclosure.

FIG. 23 is a diagram illustrating a constellation to be observed at a transmitter and a receiver.

FIG. 24 is a flowchart for explaining an operation method of a user equipment (UE) proposed in the present disclosure.

FIG. 25 is a flowchart for explaining an operation method of a base station proposed in the present disclosure.

MODE FOR INVENTION

Figure 1:
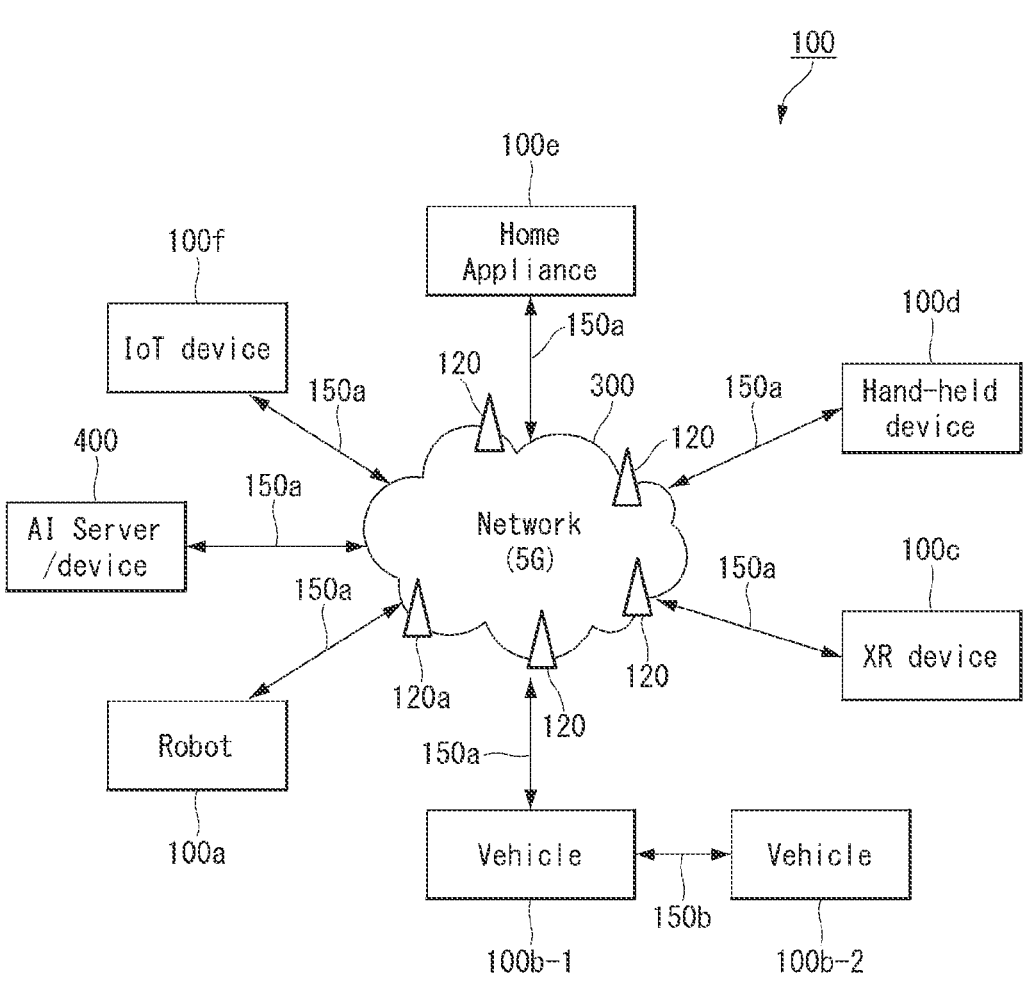
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE. NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
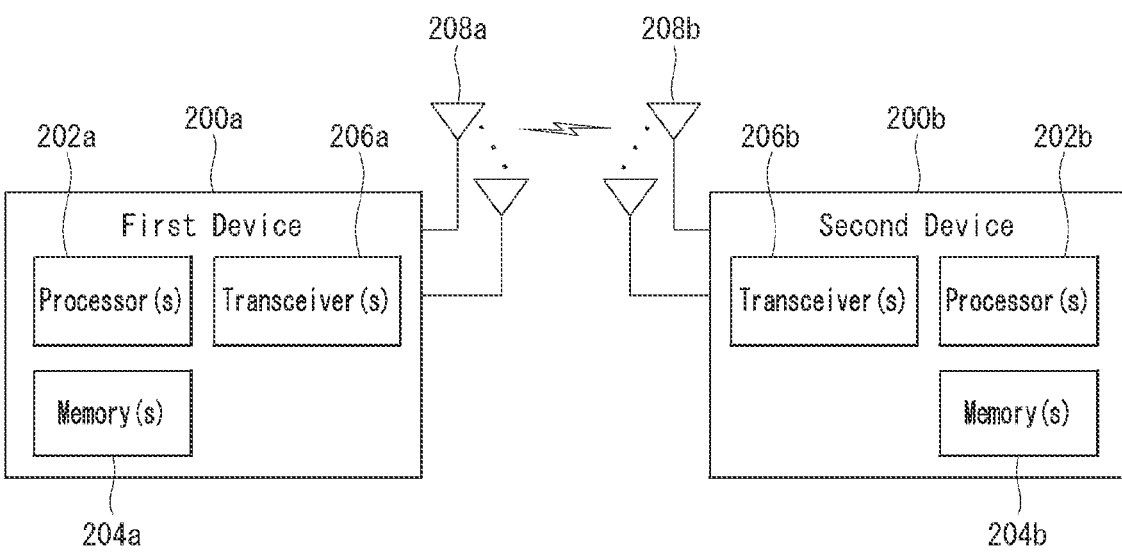
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, (the first wireless device 200a, the second wireless device 200b) may correspond to (the wireless device 100x, the base station 1201 and/or (the wireless device 100x, the wireless device 100x of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 3:
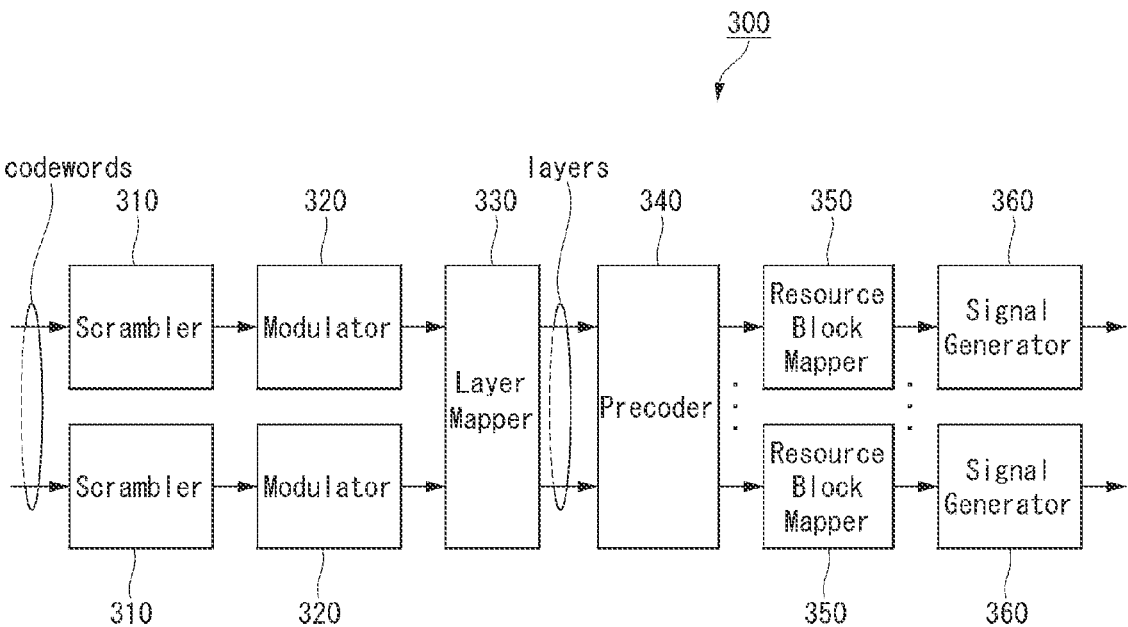
FIG. 3 is a view showing a method of processing a transmitted signal applicable to the present disclosure.

FIG. 3 is a view showing a method of processing a transmitted signal applicable to the present disclosure. For example, the transmitted signal may be processed by a signal processing circuit. At this time, a signal processing circuit 1200 may include a scrambler 300, a modulator 320, a layer mapper 330, a precoder 340, a resource mapper 350, and a signal generator 360. At this time, for example, the operation/function of FIG. 3 may be performed by the processors 202a and 202b and/or the transceiver 206a and 206b of FIG. 2. In addition, for example, the hardware element of FIG. 3 may be implemented in the processors 202a and 202b of FIG. 2 and/or the transceivers 206a and 206b of FIG. 2. In addition, for example blocks 310 to 350 may be implemented in the processors 202a and 202b of FIG. 2 and a block 360 may be implemented in the transceivers 206a and 206b of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a in fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 320 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 5:
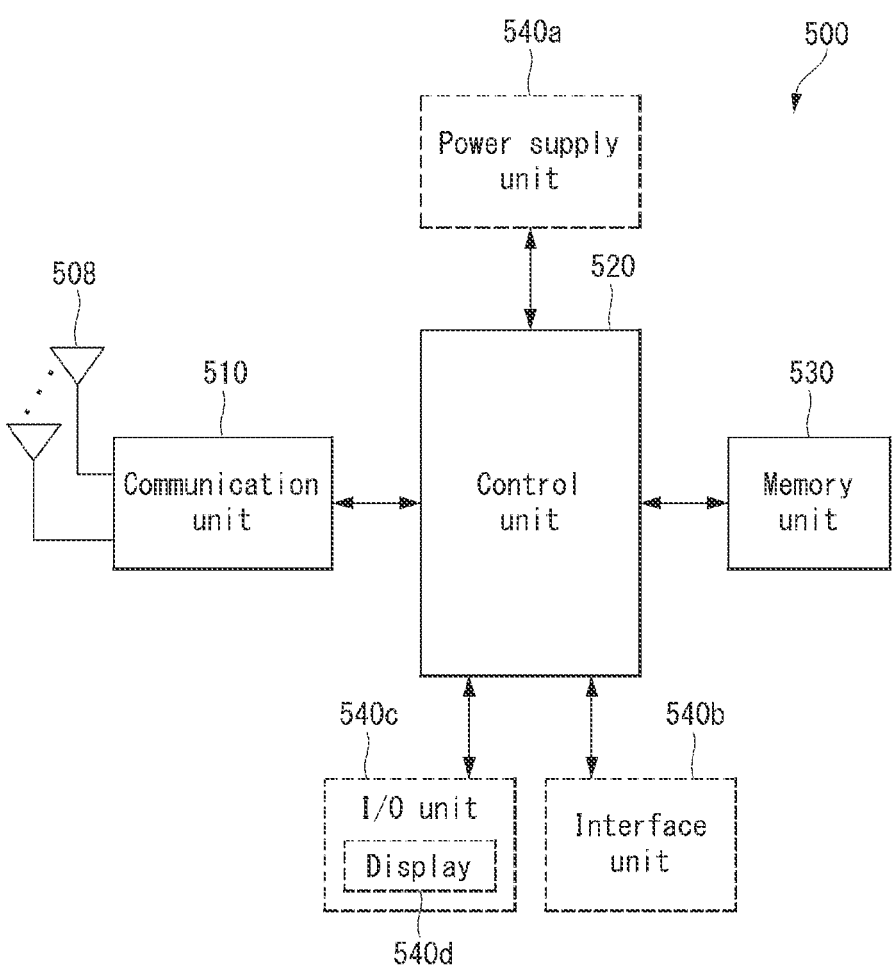
FIG. 5 is a view showing an example of a hand-held device applicable to the present disclosure.

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/540*a* to 540*c* may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 430 may store input/output data/information, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 440*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit in 530 and then output through the input/output unit 540*c* in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

FIG. 5 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), preceding matrix indication (PMI), rank indication (RI), beam indication (B) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 7:
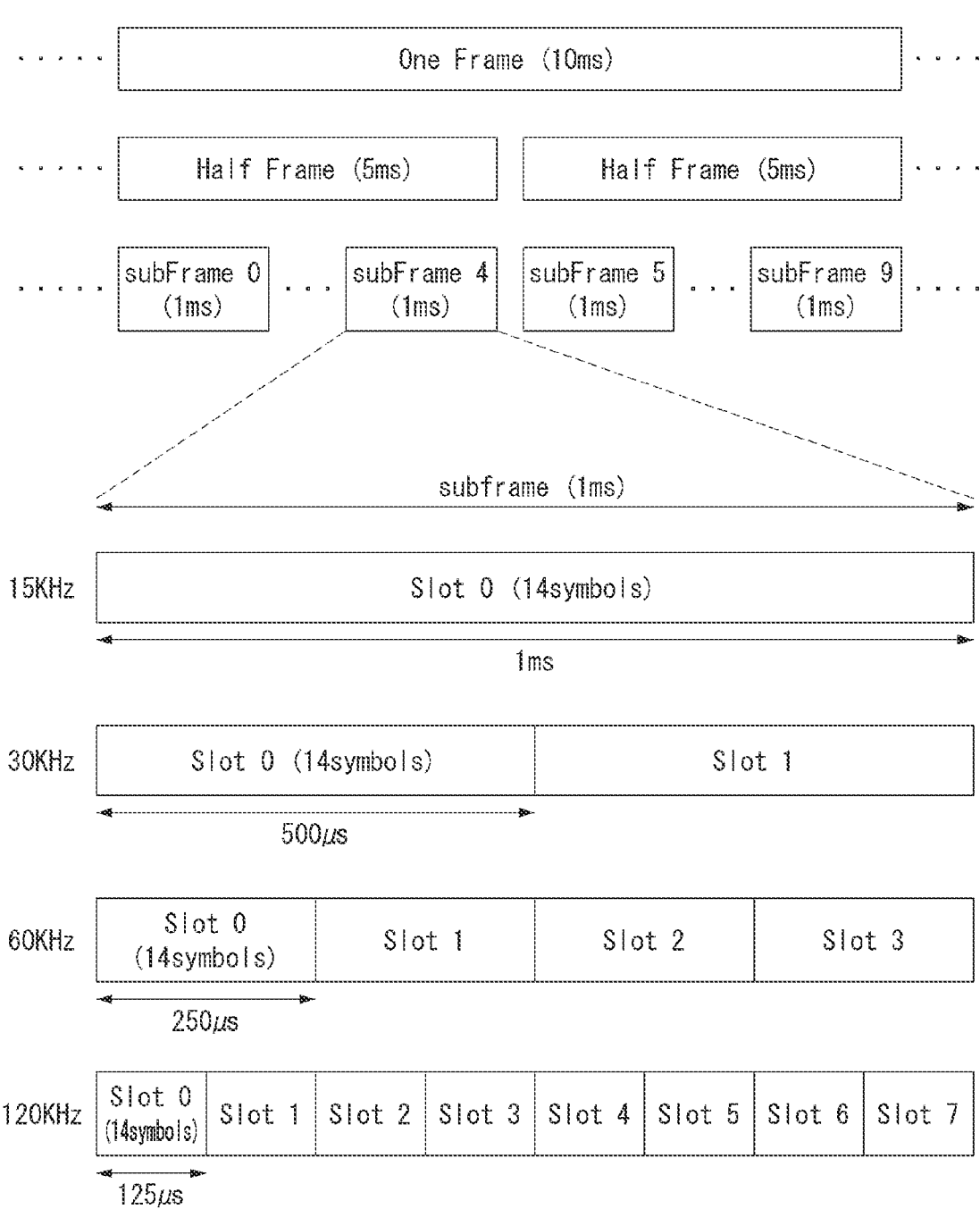
FIG. 7 is a view showing the structure of a radio frame applicable to the present disclosure.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{frame,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{frame,\mu}$ |
|---|---|---|---|
| 2 | 12 | 40 | 4 |

In Tables 1 and 2 above, Nslotsymb may indicate the number of symbols in a slot, Nframe,μslot may indicate the number of slots in a frame, and Nsubframe,μslot may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TT1) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 8:
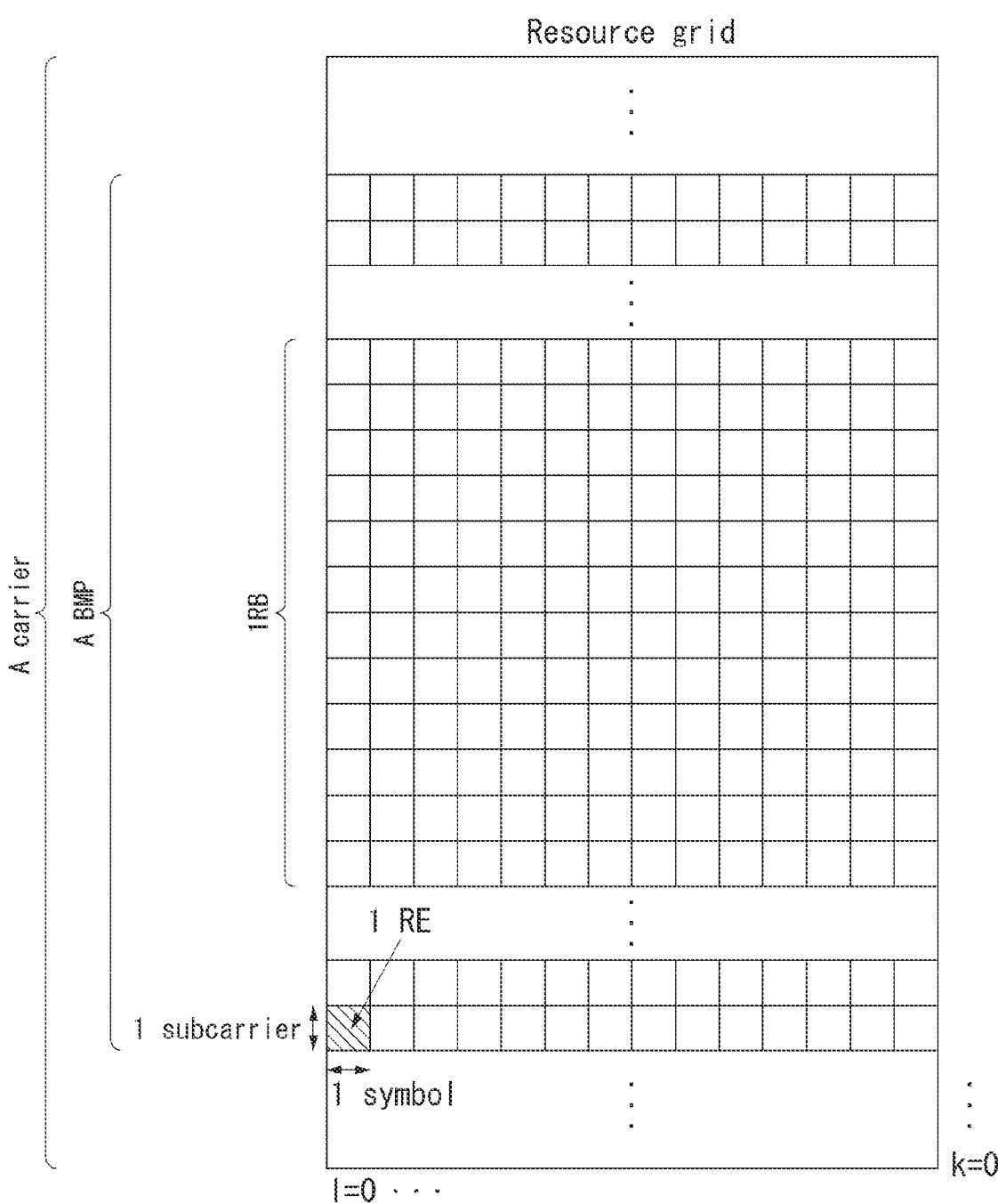
FIG. 8 is a view showing a slot structure applicable to the present disclosure.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC). AI integrated communication, tactile Internet, high throughput, high network capacity, high energy efficiency, low backhaul and access network congestion and enhanced data security.

Figure 9:
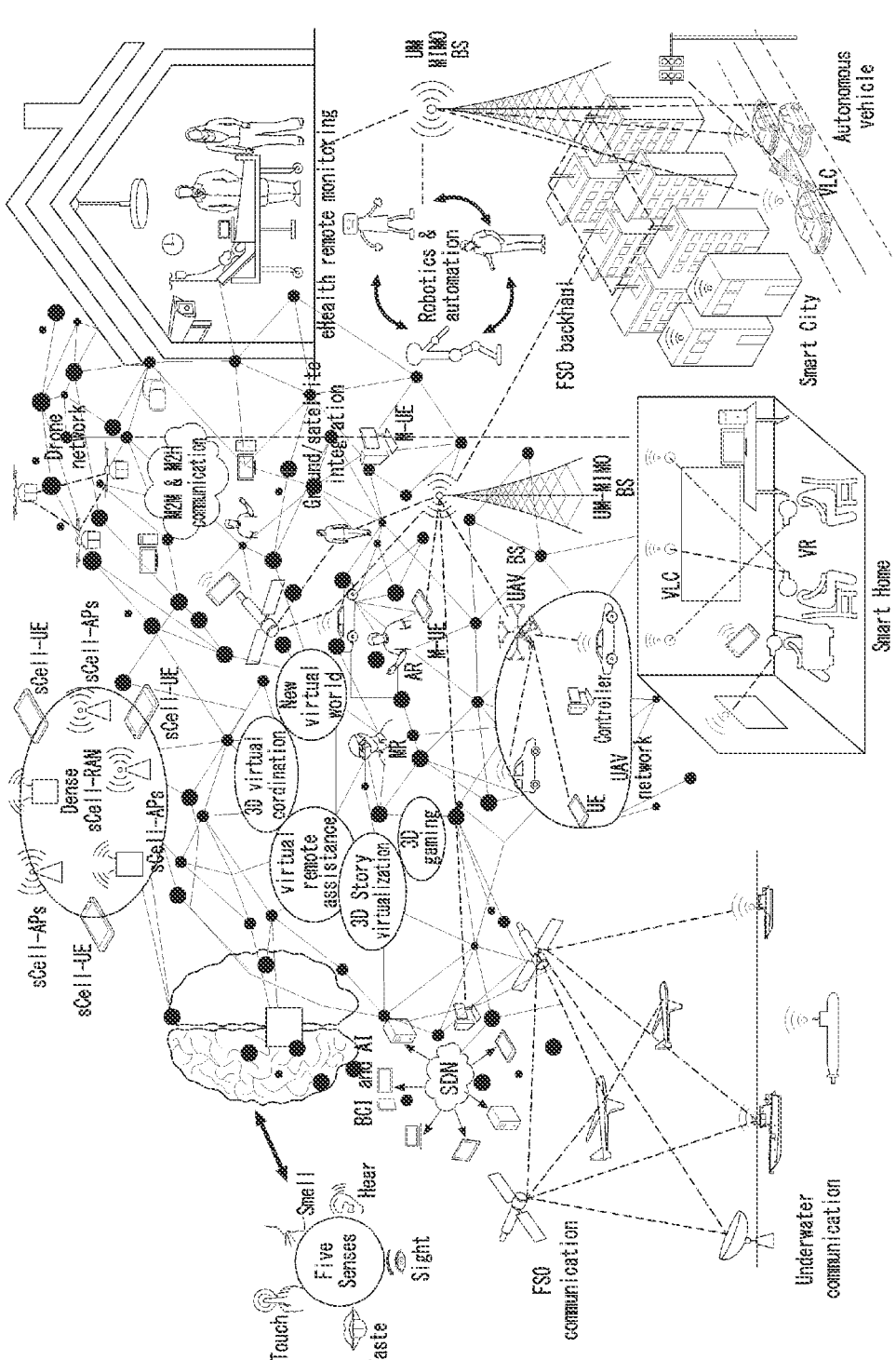
FIG. 9 is a view showing an example of a communication structure providable in a 6G system applicable to the present disclosure.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced batten, technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AT-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol in detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers a process of repeatedly inputting training data to a neural network, calculating the error of the output and target of the neural network for the training data, backpropagating the error of the neural network from the output layer of the neural network to an input layer in order to in reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting multiple perceptrons.

Figure 10:
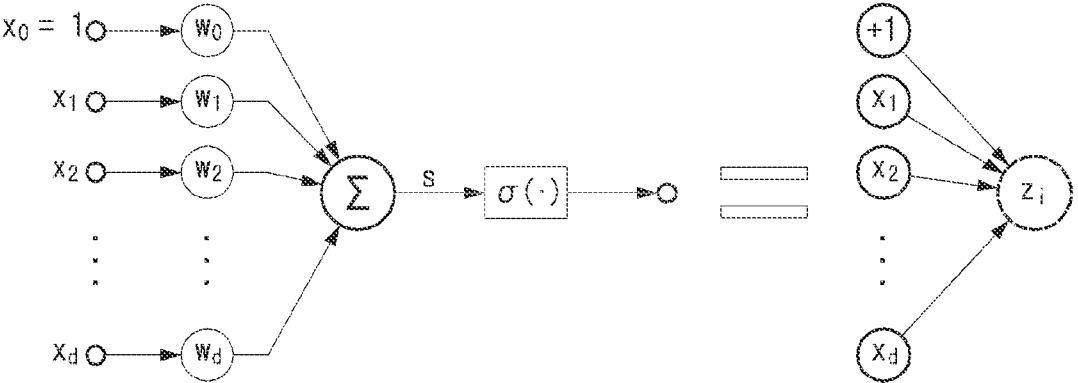
FIG. 10 illustrates an example of a structure of a perceptron.

FIG. 10 illustrates an example of a structure of a perceptron.

Referring to FIG. 10, when an input vector x=(x1, x2, . . . , xd) is input, each component is multiplied by a weight (W1, W2, . . . , Wd), and all the results are summed. After that, the entire process of applying an activation function $\sigma(\cdot)$ is called a perceptron. The huge artificial neural network structure may extend the simplified perceptron structure illustrated in FIG. 10 to apply the input vector to different multidimensional perceptrons. For convenience of explanation, an input value or an output value is referred to as a node.

Figure 11:
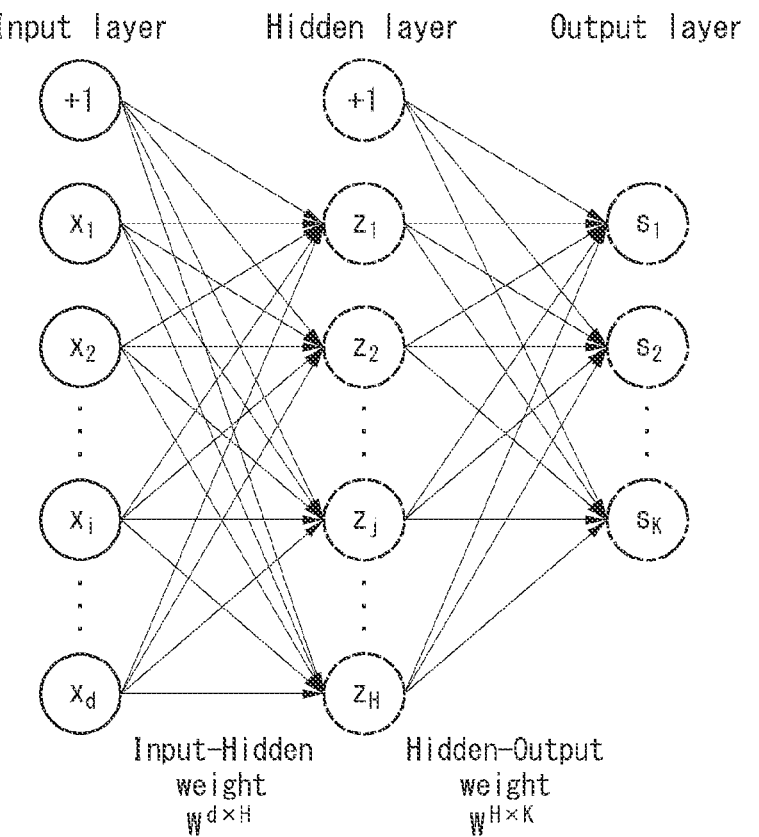
FIG. 11 illustrates an example of a structure of a multi-layer perceptron.

The perceptron structure illustrated in FIG. 10 may be described as consisting of a total of three layers based on the input value and the output value. FIG. 11 illustrates an artificial neural network in which the number of (d+1) dimensional perceptrons between a first layer and a second layer is H, and the number of (H+1) dimensional perceptrons between the second layer and a third layer is K, by way of example. FIG. 11 illustrates an example of a structure of a multilayer perceptron.

A layer where the input vector is located is called an input layer, a layer where a final output value is located is called an output layer, and all layers located between the input layer and the output layer are called a hidden layer. FIG. 11 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

Figure 12:
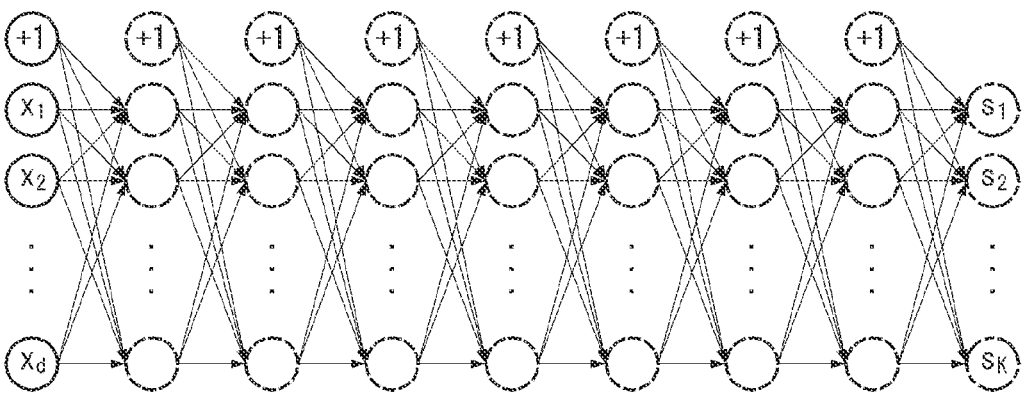
FIG. 12 illustrates an example of a deep neural network.

The deep neural network illustrated in FIG. 12 is a multilayer perceptron consisting of eight hidden layers+ eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output.

Based on how the plurality of perceptrons are connected to each other, various artificial neural network structures different from the above-described DNN can be formed.

In the DNN, nodes located inside one layer are arranged in a one-dimensional in longitudinal direction. However, in FIG. 13, it may be assumed that w nodes horizontally and h nodes vertically are arranged in two dimensions (convolutional neural network structure of FIG. 6). In this case, since in a connection process leading from one input node to the hidden layer, a weight is given for each connection, a total of h×w weights needs to be considered. Since there are h×w nodes in the input layer, a total of h2w2 weights are required between two adjacent layers.

Figure 13:
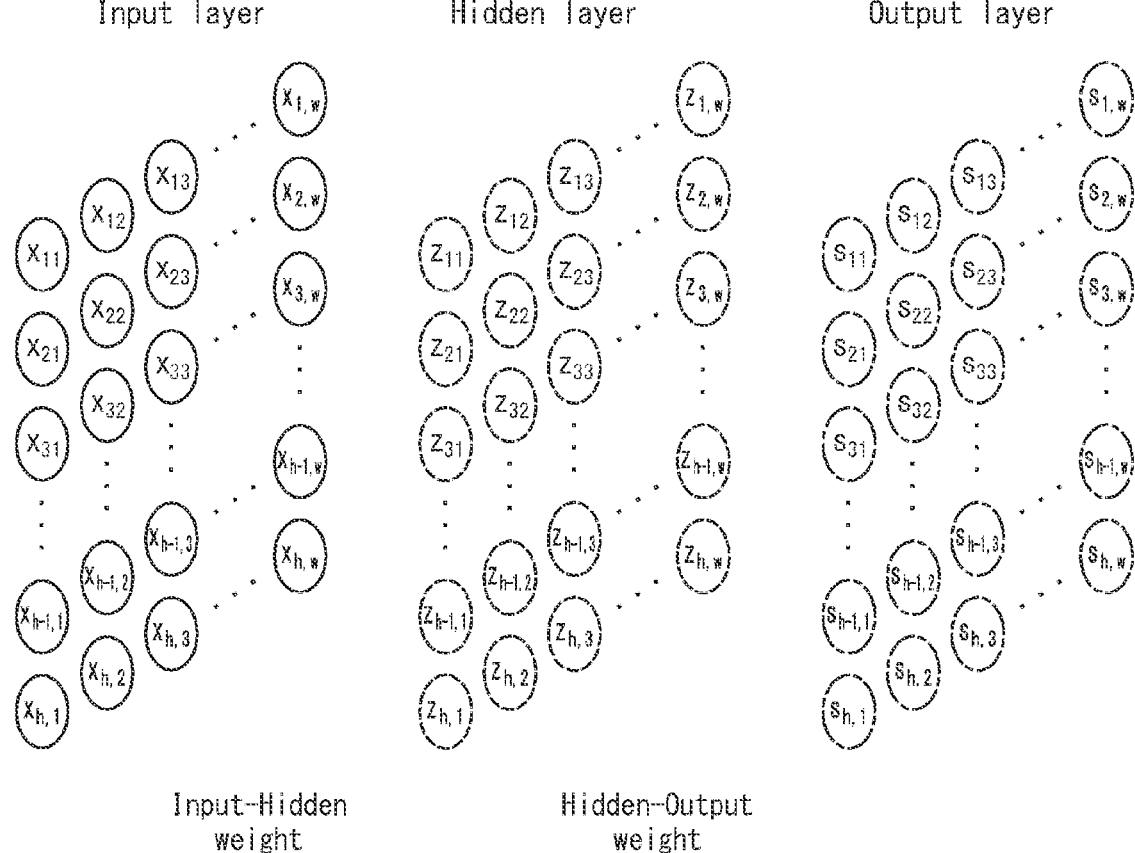
FIG. 13 illustrates an example of a convolutional neural network.
Figure 14:
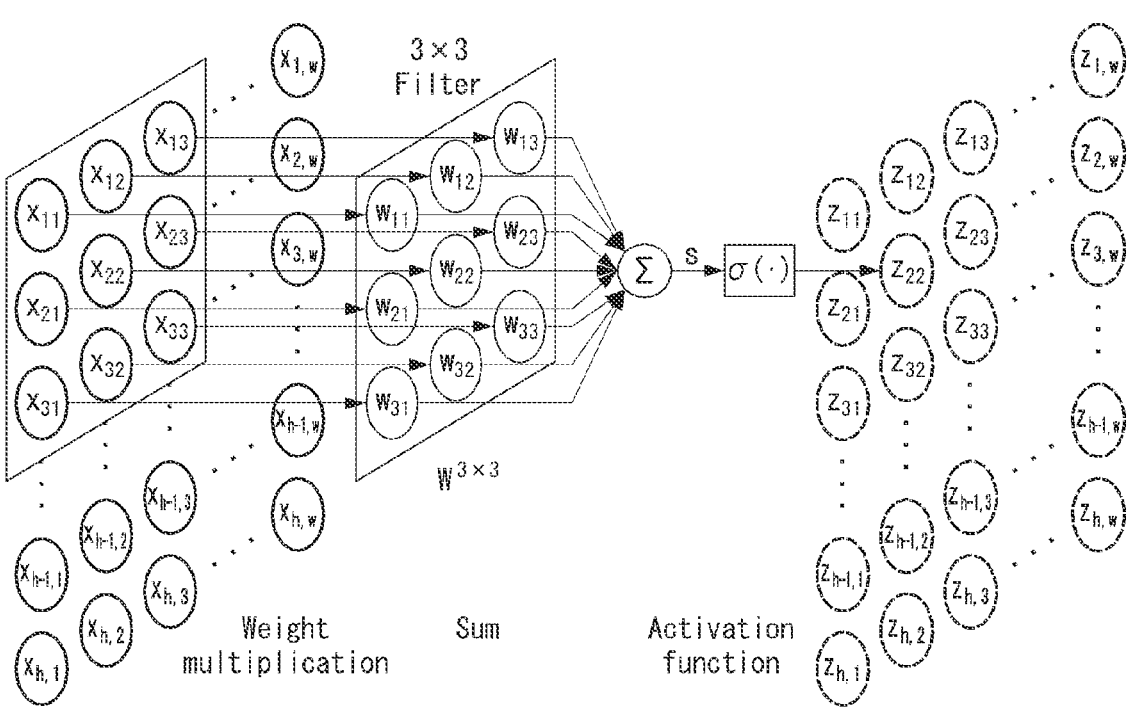
FIG. 14 illustrates an example of a filter operation in a convolutional neural network.

The convolutional neural network of FIG. 13 has a problem in that the number of weights increases exponentially depending on the number of connections. Therefore, instead of considering the connections of all the nodes between adjacent layers, it is assumed that a small-sized filter exists, and a weighted sum and an activation function calculation are performed on an overlap portion of the filters as illustrated in FIG. 14.

One filter has a weight corresponding to the number as much as its size, and learning of the weight may be performed so that a certain feature on an image can be extracted and output as a factor. In FIG. 14, a filter having a size of 3×3 is applied to the upper leftmost 3×3 area of the input layer, and an output value obtained by performing a weighted sum and an activation function calculation for a corresponding node is stored in z22.

The filter performs the weighted sum and the activation function calculation while moving horizontally and vertically by a predetermined interval when scanning the input layer, and places the output value at a location of a current filter. This calculation method is similar to the convolution operation on images in the field of computer vision. Thus, a deep neural network with this structure is referred to as a convolutional neural network (CNN), and a hidden layer generated as a result of the convolution operation is referred to as a convolutional layer. In addition, a neural network in which a plurality of convolutional layers exists is referred to as a deep convolutional neural network (DCNN).

At the node where a current filter is located at the convolutional layer, the number of weights may be reduced by calculating a weighted sum including only nodes located in an area covered by the filter. Hence, one filter can be used to focus on features for a local area. Accordingly, the CNN can be effectively applied to image data processing in which a physical distance on the 2D area is an important criterion. In the CNN, a plurality of filters may be applied immediately before the convolution layer, and a plurality of output results may be generated through a convolution operation of each filter.

There may be data whose sequence characteristics are important depending on data attributes. A structure, in which a method of inputting one element on the data sequence at each time step considering a length variability and a relationship of the sequence data and inputting an output vector (hidden vector) of a hidden layer output at a specific time step together with a next element on the data sequence is applied to the artificial neural network, is referred to as a recurrent neural network structure.

Figure 15:
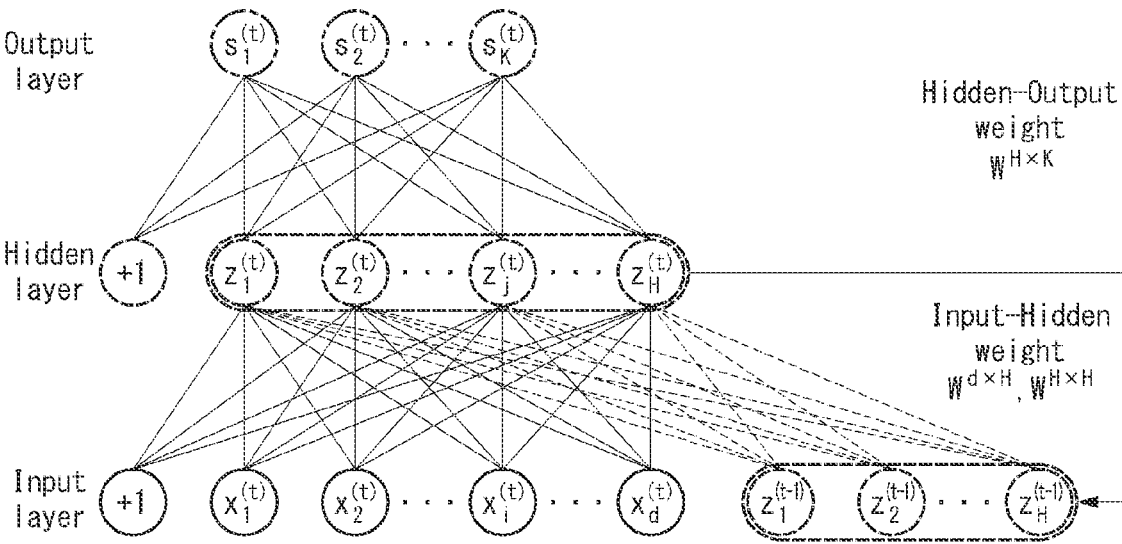
FIG. 15 illustrates an example of a neural network structure in which a circular loop exists.

FIG. 15 illustrates an example of a neural network structure in which a circular loop exists.

Referring to FIG. 15, a recurrent neural network (RNN) is a structure in which a process of inputting elements (x1(t), x2(t), . . . , xd(t)) of any line of sight 't' on a data sequence a fully connected neural network, hidden vectors (z1(t−1), z2(t−1), . . . , zH(t−1)) are input together at an immediately previous time step (t−1) to apply a weighted sum and an activation function. A reason for transferring the hidden vectors at a next time step is that information in within the input vector in previous time steps is considered to be accumulated on the hidden vectors of a current time step.

Figure 16:
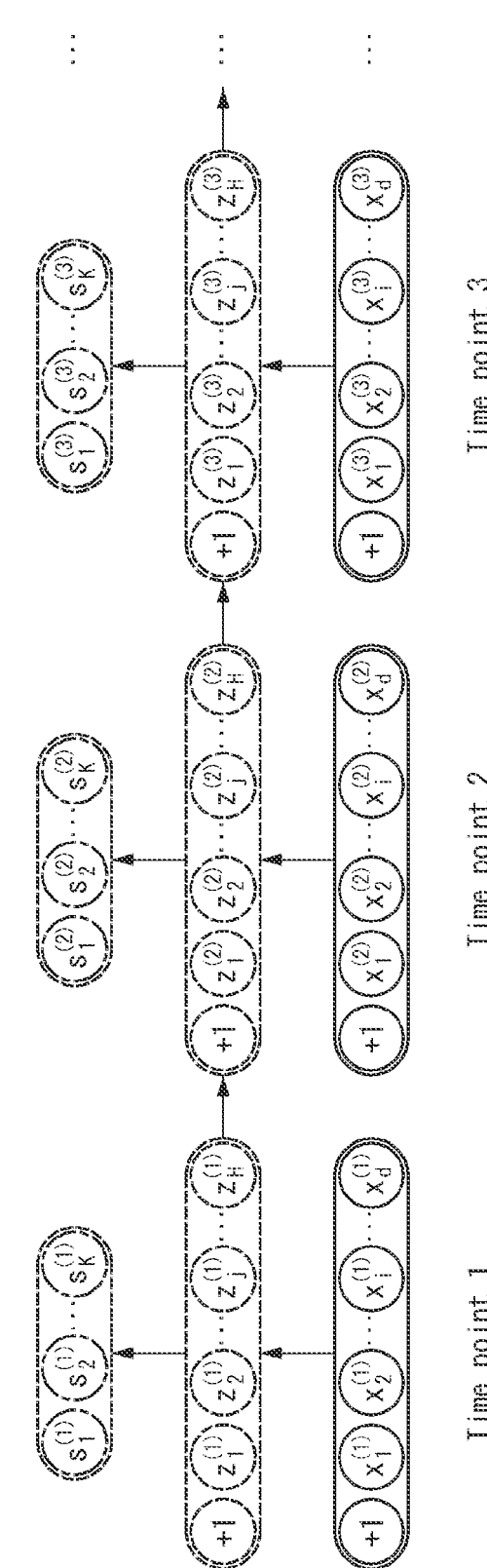
FIG. 16 illustrates an example of an operation structure of a recurrent neural network.

FIG. 16 illustrates an example of an operation structure of a recurrent neural network.

Referring to FIG. 16, the recurrent neural network operates in a predetermined order of time with respect to an input data sequence.

Hidden vectors (z1(1), z2(1), . . . , zH(1)) when input vectors (x1(t), x2(t), . . . , xd(t)) at a time step 1 are input to the recurrent neural network, are input together with input vectors (x1(2), x2(2), . . . , xd(2)) at a time step 2 to determine vectors (z1(2), z2(2), . . . , zH(2)) of a hidden layer through a weighted sum and an activation function. This process is repeatedly performed at time steps 2, 3, . . . , T.

When a plurality of hidden layers are disposed in the recurrent neural network, this is referred to as a deep recurrent neural network (DRNN). The recurrent neural network is designed to be usefully applied to sequence data (e.g., natural language processing).

A neural network core used as a learning method includes various deep learning methods such as a restricted Boltzmann machine (RBM), a deep belief network (DBN), and a deep Q-network, in addition to the DNN, the CNN, and the RNN, and may be applied to fields such as computer vision, speech recognition, natural language processing, and voice/signal processing.

Recently, attempts to integrate AI with a wireless communication system have appeared, but this has been concentrated in the field of wireless resource management and allocation in the application laver, network layer, in particular, deep learning. However, such research is gradually developing into the MAC laver and the physical layer, and in particular, attempts to combine deep learning with wireless transmission in the physical layer have appeared. The AI-based physical laver transmission refers to applying a signal processing and communication mechanism based on an AI driver, rather than a traditional communication framework in the fundamental signal processing and communication mechanism. For example, deep learning-based channel coding and decoding, deep learning-based signal estimation and detection, deep learning-based MIMO mechanism, AI-based resource scheduling and allocation, and the like, nay be included.

Federated learning is one of the techniques of distributed machine learning techniques, in the federated learning, multiple devices that are the subject of learning share parameters such as weights and gradients of the server and local models, and the server operates in a way of collecting local model parameters of each device and updating global parameters. Here, the local model parameters may also be referred to as local parameters.

In this process, the raw data of each device is not shared, so communication overhead during data transmission can be improved and personal information can be protected.

Figure 17:
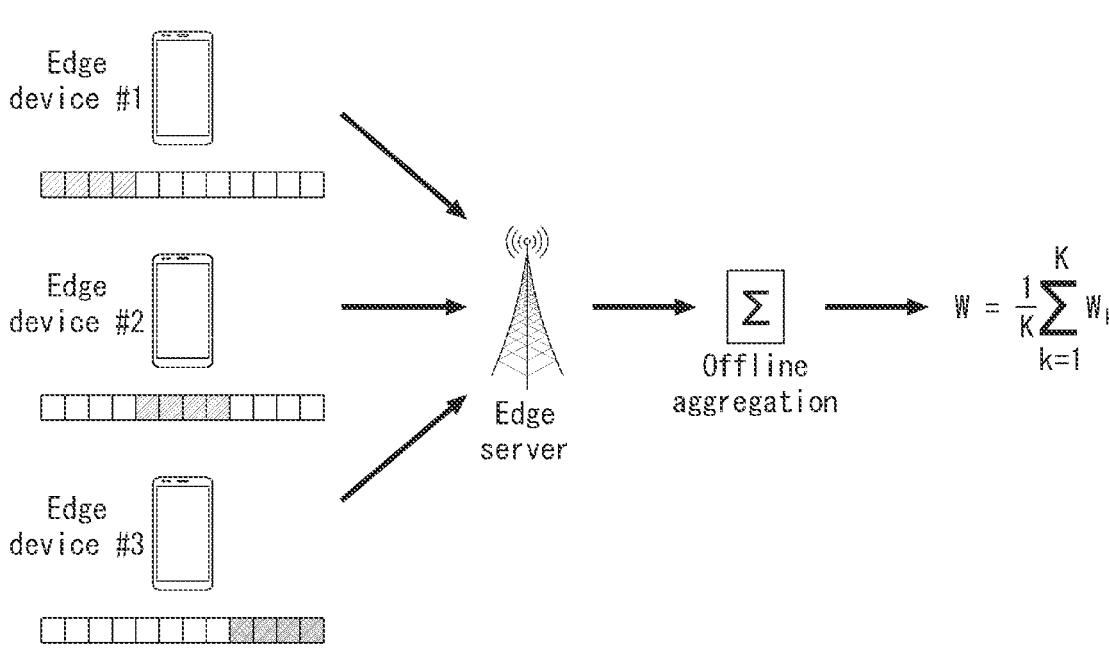
FIG. 17 illustrates an example of a federated learning operation based on orthogonal division access.

FIG. 17 illustrates an example of a federated learning operation based on orthogonal division access. Referring to FIG. 17, a device (e.g. Edge device #1 #2 #3) transmits local parameters to a server (e.g. Edge server) through its allocated resources, and the server performs offline aggregation on local parameters received from the device. Typically, the server derives global parameters by averaging all local parameters and transmits them back to the device.

However, this method has a very large overhead in terms of wireless resource use. That is, wireless resources are required linearly as the number of devices participating in learning. Additionally, under limited resources (e.g. time resources or frequency resources), as the number of devices participating in learning increases, the time for updating global parameters may be delayed.

To solve this problem, research on AirComp (Over-the-Air Computation)-based federated learning has recently been conducted.

Figure 18:
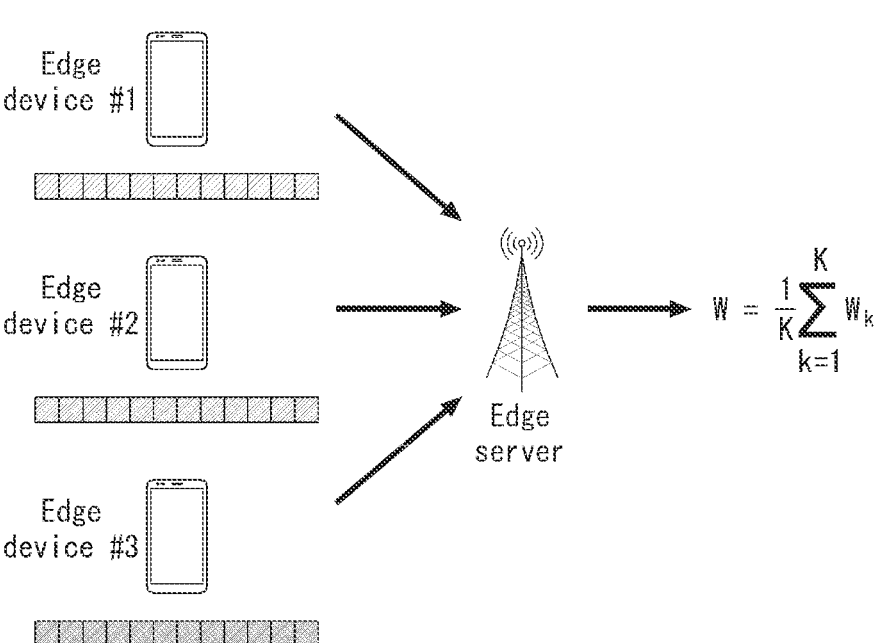
FIG. 18 illustrates an example of an AirComp-based federated learning operation.

FIG. 18 illustrates an example of an AirComp-based federated learning operation. AirComp means that all devices (e.g. Edge device #1 #2 #3) utilize the same resources to transmit local parameters to the server (e.g. Edge server) in an analog or digital manner, as shown in FIG. 18, the signals received to the server are naturally superposed on the air, and the server can obtain the sum of local parameters. Here, the analog method may mean simple pulse amplitude modulation (PAM) of the weight value (gradient value), and the digital method may mean quadrature amplitude modulation (QAM) or phase shift key (PSK), which are typical digital modulation methods.

Because AirComp-based federated learning transmits local parameters through the same resource, latency is not significantly affected by the number of devices participating in learning and is efficient in terms of wireless resource management.

This AirComp method generally assumes equal weighted summation when aggregating local weights (or local parameters). In other words, this means that the received power sensitivity of each device and server is adjusted to be the same. However, considering that the distance and/or channel quality between each device and the server are different in the actual network topology, this is not realistic.

Figure 19:
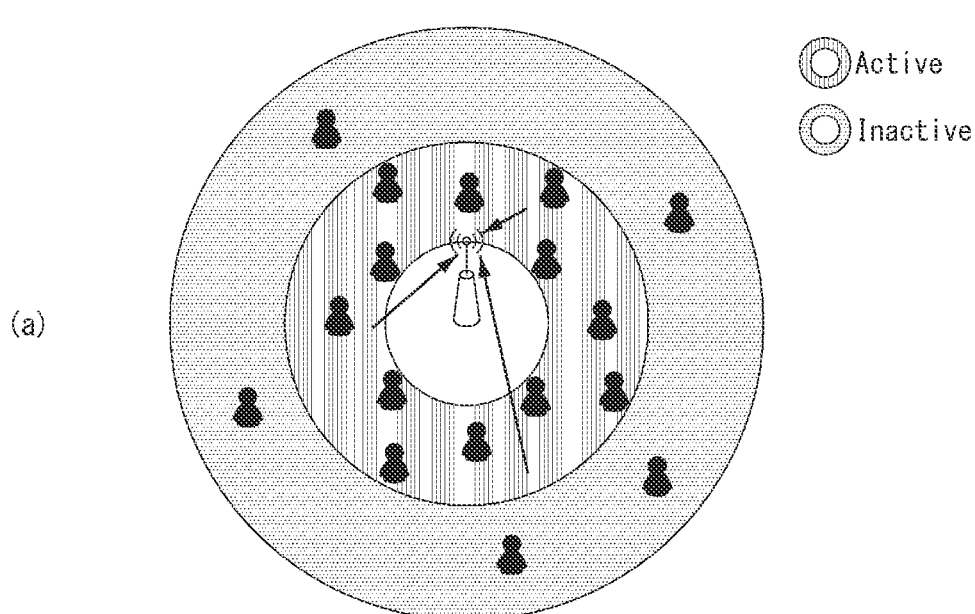
FIG. 19 illustrates an example of AirComp-based federated learning considering an actual network structure.
Figure 19:
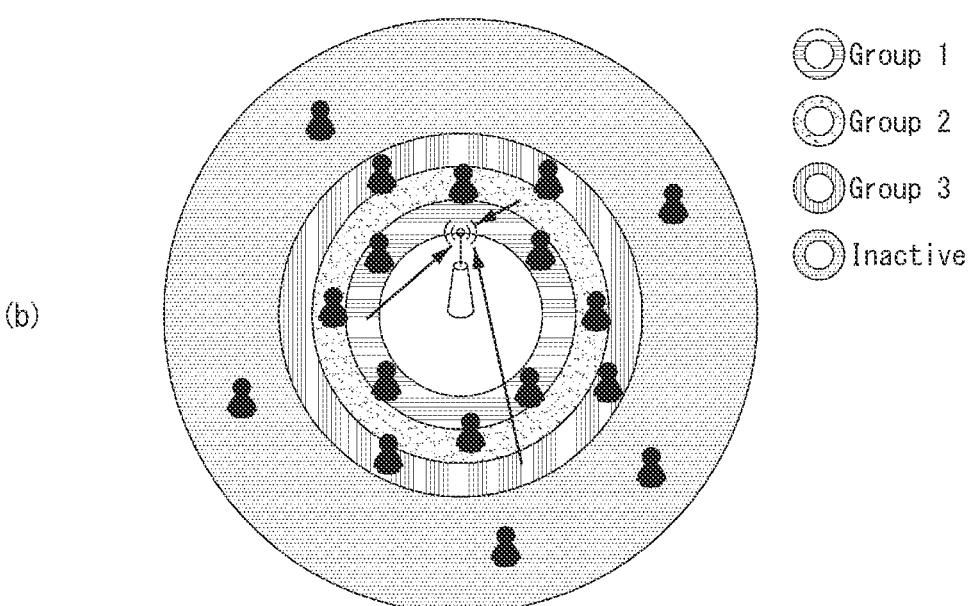

FIG. 19 illustrates an example of AirComp-based federated learning considering an actual network structure. Referring to FIG. 19, if a device is located quite far from the server and the channel quality is low, it is classified as an inactive device (not participating in federated learning), and participating devices largely use AirComp in two ways.

One method, as shown in FIG. 19 (a), is a method of transmitting it according to the user with the worst reception sensitivity among all active users, and in this case, the power loss of the user with good reception sensitivity is significant.

Another method, as shown in FIG. 19 (*b*), is a method of forming a group of devices with similar large-scale fading and transmitting it by performing power control within the group. In this case, all devices in the group can transmit it based on AirComp with the same reception sensitivity, but there is a disadvantage that resource overhead increases by the number of groups by using orthogonal resources between different groups.

The present disclosure proposes a scheduling method that solves the issues of difference in reception sensitivity, power efficiency, and resource overhead between each device and server during AirComp using restriction-based scalable Q-ary linear codes. In other words, the present disclosure proposes a scheduling method using the characteristic that the system part and the parity part can transmit a modulation symbol sequence using different modulation orders during AirComp using restriction-based scalable Q-any linear codes. Here, the system part may also be referred to as an information part. Additionally, the restriction-based scalable Q-ary linear code may mean a code generated by Q-ary linear coding of restriction-based Q-ary information.

That is, the scheduling method proposed in the present disclosure is a method of power allocation and resource management considering that the systematic part and the parity in part use different Q-ary.

The proposed method has the following advantages based on information restriction.

(1) In the proposed method of the present disclosure, the systematic part and the parity part transmit different sequences of Q-ary due to information restriction. As different Q-ary sequences are transmitted, it is possible to modulate and transmit them with different modulation orders.

(2) In the proposed method of the present disclosure, the systematic part can be transmitted with low-order modulation. Accordingly, in the present disclosure, the systematic part can achieve the same reception sensitivity by utilizing relatively lower power than the parity part. Therefore, the systematic part can achieve target reception sensitivity through a single transmission, and the parity part can achieve target reception sensitivity by utilizing multiple transmissions.

(3) In the proposed method of the present disclosure, the parity part can be modulated with a relatively high order, and a parity part that uses high-order modulation with a fixed number of repetitions can improve transmission power consumption efficiency by transmitting evenly during transmission.

Hereinafter, in the present disclosure, the proposed method is described by dividing it into restriction-based scalable Q-ary linear code and a codeword and modulation method in restriction-based scalable Q-ary linear code, and a power allocation and resource management method using a restriction-based Q-ary linear code.

Hereinafter, the embodiments described in the present disclosure are divided only for convenience of explanation, and it goes without saying that some methods and/or components in of one embodiment may be replaced with methods and/or components of another embodiment, or may be applied in combination with each other.

Hereinafter, in the present disclosure, regular characters represent scalars, bold lowercase characters and bold uppercase characters represent vectors and matrices, and calligraphic characters mean sets. For example, x, x, X and $\mathbb{X}$ stand for scalar, vector, matrix, and set. x[i] refers to ith entry of vector x and represents $$[x[i]]_{i=m}^n = [x[m], x[m+1], \ldots , x[n]].$$

$\lceil \cdot \rceil$, $\lfloor \cdot \rfloor$ and $(\cdot)_q$ stand for ceiling, flooring and modulo-q operations. $|x|$ and $|x|$(or $|\mathbb{X}|$) represent the absolute value of x and the cardinality of x(or $\mathbb{X}$), and $|\cdot|_2$ represents $l_2$-norm. Here, $l_2$-norm represents the vector size in an n-dimensional coordinate plane (or Euclidean space), and when expressed as an equation, it may be equal to $$|x|_2 = \sqrt{\sum_{i=1}^n |x_i|^2}.$$

$\mathbb{N}$ and $\mathbb{N}$ refer to the set of all natural numbers and the set of natural numbers smaller than Q. It means $\beta(a)=1$ if $a \geq 0$ or 0 otherwise, and $0_n$ means all zero vector with length n.

Additionally, hereinafter, in the present disclosure, a server may be referred to as a base station, and a device may be referred to as a UE.

First, restriction-based scalable Q-ary linear codes are described.

Restriction-Based Scalable Q-Ary Linear Code

Q-ary linear code (or coding) may mean a linear transformation in a finite field of Q order.

First, the definition of a finite field is described.

A set $\mathbb{F}$ composed of arbitrary finite elements that satisfy the four properties below can be defined as a finite field.

(1) In set $\mathbb{F}$, addition and multiplication are defined.

(2) The commutative law/combination law/distributive law holds for addition/multiplication.

(3) There is an identity 0 of addition, and inverses of addition exist for all elements f of the set $\mathbb{F}$.

(4) There is a multiplicative identity of 1, and there are multiplicative inverses for every element f of the set $\mathbb{F}$.

A finite field that satisfies the above properties can be constructed in two ways.

Specifically, when the value of Q, which represents the order of the finite field, is a prime number, and when the value of Q is a power of a prime number, the finite field may be configured in different ways.

(1) When Q=Prime Number

When the value of Q, which represents the order of the finite field, is a prime number, the finite field is defined based on the integer modulo-Q operation. For example, when Q is 2 or 3, addition/multiplication of the finite fields $\mathbb{F}_2=\{0,1\}$ and $\mathbb{F}_3=\{0, 1, 2\}$ can be defined as shown in Tables 5 and 6 below.

TABLE 5

| + | 0 | 1 | × | 0 | 1 |
|---|---|---|---|---|---|
| 0 | 0 | 1 | 0 | 0 | 0 |
| 1 | 1 | 0 | 1 | 0 | 1 |

TABLE 6

| + | 0 | 1 | 2 | × | 0 | 1 | 2 |
|---|---|---|---|---|---|---|---|
| 0 | 0 | 1 | 2 | 0 | 0 | 0 | 0 |
| 1 | 1 | 2 | 0 | 1 | 0 | 1 | 2 |
| 2 | 2 | 0 | 1 | 2 | 0 | 2 | 1 |

(2) When $Q=q^n$ and q=Prime Number

In the case of $Q=q^n$, no finite fields are defined based on integer modulo-Q operations. In this case, the finite field can be defined by extending the field defined in $q^m$ for $$m \in \{1 \le m < n \mid \frac{n}{m}$$

is integer}. More specifically, the finite field that is $Q=q^n$ can be defined by extending the primitive polynomial over $GF(q^m)$] for $GF(q^m)$ with Degree-(n/m) from the field defined in $GF(q^m)$. Here, the primitive polynomial over $GF(q^m)$, with Degree-(n/m), is defined as follows.

If an irreducible polynomial with Degree-(n/m) (a polynomial that is not expressed as a product of polynomials of lower degree) satisfies the condition "divides $z^Q+1$, where the smallest Q is $q^n$," then the GF(Q) field constructed based on the primitive polynomial over $GF(q^m)$ with Degree-(n/m) can be expressed as $\mathbb{F}_{Q,q^m}$.

For example, in the case of $Q=2^4$, the GF(16) field can be constructed by expanding the primitive polynomial for GF(2) with Degree-4 or the primitive polynomial for GF(4) with Degree-2, and can be expressed as $\mathbb{F}_{16,2}$ and $\mathbb{F}_{16,4}$, respectively. Tables 7 and 8 below show the primitive polynomials for GF(2) with Degree-4 and the primitive polynomials for GF(4) with Degree-2 as $\mathbb{F}_{16,2}$ and $\mathbb{F}_{16,4}$, respectively. More specifically, Table 7 is $\mathbb{F}_{16,2}$ using the primitive polynomial $p(z)=1+z+z^4$ (over GF(2)) for GF(2), and Table 8 is $\mathbb{F}_{16,4}$ using the primitive polynomial $p(z)=2+z+z^2$(over GF(4) for GF(4).

TABLE 7

| symbol | polynomial | Binary vector |
|---|---|---|
| 0 | 0 | 0000 |
| $\alpha^0$ | 1 | 0001 |
| $\alpha^1$ | z | 0010 |
| $\alpha^2$ | $z^2$ | 0100 |
| $\alpha^3$ | $z^3$ | 1000 |
| $\alpha^4$ | z + 1 | 0011 |
| $\alpha^5$ | $z^2 + z$ | 0110 |
| $\alpha^6$ | $z^3 + z^2$ | 1100 |
| $\alpha^7$ | $z^3 + z + 1$ | 1011 |
| $\alpha^8$ | $z^2 + 1$ | 0101 |
| $\alpha^9$ | $z^3 + z$ | 1010 |
| $\alpha^{10}$ | $z^2 + z + 1$ | 0111 |
| $\alpha^{11}$ | $z^3 + z^2 + z$ | 1110 |
| $\alpha^{12}$ | $z^3 + z^2 + z + 1$ | 1111 |
| $\alpha^{13}$ | $z^3 + z^2 + 1$ | 1101 |
| $\alpha^{14}$ | $z^3 + 1$ | 1001 |

TABLE 8

| symbol | polynomial | Binary vector |
|---|---|---|
| 0 | 0 | 00 |
| $\alpha^0$ | 1 | 01 |
| $\alpha^1$ | z | 10 |
| $\alpha^2$ | z + 2 | 12 |
| $\alpha^3$ | 3z + 2 | 32 |
| $\alpha^4$ | z + 1 | 11 |
| $\alpha^5$ | 2 | 02 |
| $\alpha^6$ | 2z | 20 |
| $\alpha^7$ | 2z + 3 | 23 |
| $\alpha^8$ | z + 3 | 13 |
| $\alpha^9$ | 2z + 2 | 22 |
| $\alpha^{10}$ | 3 | 03 |
| $\alpha^{11}$ | 3z | 30 |
| $\alpha^{12}$ | 3z + 1 | 31 |
| $\alpha^{13}$ | 2z + 1 | 21 |
| $\alpha^{14}$ | 3z + 3 | 33 |

Table 9 shows a process by which the Q-ary linear code based on the finite field is transformed into a scalable Q-ary linear code with restricted order through restriction.

TABLE 9

| | Q = prime number | $Q = q^2$ where $q = p^i$ for $i \in \mathbb{N}$ and p is prime number |
|---|---|---|
| General Q-ary linear code | $i \in \mathbb{Z}_{Q,\rightarrow}^k, c \in \mathbb{Z}_Q^n$ with $H \in \mathbb{Z}_Q^{m \times n}$ | $i \in \mathbb{F}_{Q,q,\rightarrow}^k, c \in \mathbb{F}_{Q,q}^n$ with $H \in \mathbb{F}_{Q,q}^{m \times n}$ |
| Information restriction | $i_u \in \mathbb{Z}_{Q,\rightarrow}^k, i_u \in \mathbb{Z}_T^k$ where $T = \frac{Q'}{U}$ and $Q' < Q$ | $i_u \in \mathbb{F}_{Q,q,\rightarrow}^k, i_u \in \{0(0, 0), 1(0, 1), z(1, 0), \ldots, (q-1)z + q - 1(q-1, q-1)\}$ |
| Aggregation | $c \equiv \left(\sum_{u=1}^U c_u\right)_Q = [(c_1[n] + \ldots + c_U[n])_Q]_{n=1}^N$ | $c \equiv \left(\sum_{u=1}^U c_u\right) \bmod \mathbb{F}_{Q,q} = [(c_1[n] + \ldots + c_U[n]) \bmod \mathbb{F}_{Q,q}]_{n=1}^N$ where $(c_1[n] + \ldots + c_U[n]) \bmod \mathbb{F}_{Q,q} = \left(\sum_{u=1}^U a_{u,0}[n]\right)_q + z\left(\sum_{u=1}^U a_{u,1}[n]\right)_q$ |
| Wireless channel | | $s \equiv \sum_{u=1}^U s_u = [s_1[n] + \ldots + s_U[n]]_{n=1}^L$ |

Here, Q represents the order of a finite field or information field. In Table 9 above, the second column relates to the case where the order of the information field is a prime number, and the third column relates to the case where the order of the information field is a prime number p to the power of i. Here, i is a natural number. The second row of Table 9 above shows the process by which the order of the information field is restricted by a formula. When the order of the finite field is a prime number (column 2), the finite field of order Q is composed of a finite field of restricted order, and the order of the information field with restricted order is T. For example, in the present disclosure, restriction-based Q-ary information may mean information based on an information field/finite field with a restricted order. Alternatively, restriction-based Q-ary information may mean a scalable Q-ary linear code with restricted order.

As described above, the finite field in the case of $Q=q^n$ can be extended using a primitive polynomial over $GF(q^m)$ with Degree-(n/m). Therefore, when the order of the finite field is p, which is a prime number, to the power of i (column 3), in Table 9 above, n=i and m=i, so a finite field of unrestricted order can be defined by extension using a primitive polynomial over GF(q) with degree-2 of restricted order. That is, the GF(Q) field may be restricted to GF(q) field with Degree-2.

The third row of Table 9 represents a process of aggregating codewords generated based on the encoding of UEs participating in federated learning using an equation.

The fourth row of Table 9 represents a process by which modulated codewords are transmitted on the channel using an equation, and $s[n]=\mathcal{M}(c[n])$ stands for modulated symbol. Here, when transmitting a modulated symbol, the degree of freedom (dof) of the available orthogonal channel is 2 (I-channel/Q-channel). That is, modulation can be performed based on both the real number domain [I-channel] and the imaginary number domain [Q-channel] on the complex domain in which the modulation is performed.

If Q=prime number, the addition of symbols is trapped in modulo-Q. That is, the result of adding symbols is within an integer value from 0 to Q−1. Although aggregation modulo-Q operation does not occur in an actual wireless channel environment, no problem occurs because no information is lost. When Q=prime number, the degree of the aggregation component is 1, and the available orthogonal channel dof is 2, so during modulation, either a method using only 1-channels or a method using I/Q-channels can be used.

In the case of $Q=q^2$ where $q=p^i$ for $i\in \mathbb{N}$ and p is prime number, while performing polynomial-based field composition, the addition of symbols is confined to the modulo-q operation between polynomial components. The number of polynomial components is equivalent to the degree of the polynomial.

If the degree of the polynomial is greater than 2, multiple polynomial components are modulated in one channel, making it difficult to guarantee orthogonality between components when aggregating.

That is, ambiguity occurs in which combinations of different polynomial components are observed with the same symbol. That is, if the results of the combination of different multiple polynomial components are the same, it is impossible to determine the multiple polynomial components that make up the combination of components. Therefore, if the order Q of the field is not a prime number, based on the finite field composed of $GF(p^i)$, extending the degree-$GF(p^i)$ primitive polynomial finite field to construct the GF(Q) finite field, the GF(Q) finite field has the degree-2 polynomials over $GF(p^i)$ as polynomial components.

Therefore, when the modulated symbol is transmitted to the receiving end using the I/Q channel for each component constituting the GF(Q) finite field formed by extending the degree-2 polynomials over $GF(p^i)$, ambiguity does not occur at the receiving end.

Next, it is described that the codeword and modulation method in the restriction-based scalable Q-ary linear code are divided into the case where Q=prime number and the case where $Q=q^2$ (where, for $i\in N$, $q=p^i$, p=prime number).

Codewords and Modulation Methods in Restriction-Based Scalable Q-Ary Linear Code Case 1 (Q=Prime Number)

In Case 1, if the codeword $c_u$ of each user $u\in\{1,\ldots,U\}$ is viewed as a systematic part and a parity part, it is as shown in Equation 1 below.

$$c_u[n] = \begin{cases} c \in \mathbb{Z}_{Q_{in}}, \text{ if } n \le K, \\ c \in \mathbb{Z}_Q, \text{ else.} \end{cases} \quad \text{[Equation 1]}$$

According to Equation 1, when the length of the whole codeword is N, K may be the (sequence) length of the systematic part, and N−K may be the (sequence) length of the parity part. That is, the codeword consists of a systematic part of K length and a parity part of N−K length, and the sequence value of the systematic part is restricted. For example, the codeword in Equation 1 may mean a codeword generated by Q-ary linear coding of restricted Q-ary information (Qin-ary).

Here, $$Q_{in} = \frac{Q'}{U}$$

and Q'<Q. Q' is introduced because Q is a prime number and is not divisible by the number of users U. If Q' is a multiple of U, any value can be possible.

If the modulated sequence $s_u=\mathcal{M}(c[n])$ of $c_u$ is viewed as a systematic part and a parity part, it is as shown in Equation 2 below.

$$s_u[n] = \begin{cases} c_u[n] - b_1 \in \mathbb{Z}_{Q_{in}}, \text{ if } n \le K, \\ c_u[n] - b_2 \in \mathbb{Z}_Q, \text{ else.} \end{cases} \quad \text{[Equation 2]}$$

Here, $b_1 = \dfrac{\sum_{i=0}^{Q_{in}-1} i}{Q_{in}}$ and $b_2 = \dfrac{\sum_{i=0}^{Q-1} i}{Q}$ Case 2 ($Q=q^2$, where for $i\in N$, $q=p^i$, and p=Prime Number)

In Case 2, if the codeword $c_u$ of each user $u\in\{1,\ldots,U\}$ is viewed as a systematic part and a parity part, it is as shown in Equation 3 below.

$$c_u[n] = \begin{cases} c_{u,o}[n] + zc_{u,1}[n] \text{ where } c_{u,i}[n] \in \mathbb{Z}_{q_{in}} \text{ for } i \in P0, 1\}, \text{ if } n \le K, \\ c_{i,o}[n] + zc_{u,1}[n] \text{ where } c_{u,i}[n] \text{ for } i \in P0, 1\} \in \mathbb{Z}_q, \text{ else.} \end{cases}$$

[Equation 3]

According to Equation 3, when the length of the whole codeword is N, K may be the (sequence) length of the systematic part, and N–K may be the (sequence) length of the parity part. That is, the codeword consists of a systematic part of K length and a parity part of N–K length, and the sequence value of the systematic part is restricted. For example, the codeword in Equation 3 may mean a codeword generated by Q-ary linear coding of restricted Q-ary information.

Here, $$q_{in} = q/U \text{ and } Q_{in} = q_{in}^2.$$

If the modulated sequence $s_u = \mathcal{M}(c[n])$ of $c_u$ is viewed as a systematic part and a parity part, it is as shown in Equation 4 below.

$$s_u[n] = \begin{cases} c_{u,0}[n] - b_1 + j(c_{u,1}[n] - b_1), \text{ if } n \le K, \\ c_{u,0}[n] - b_2 + j(c_{u,1}[n] - b_2), \text{ else.} \end{cases}$$

[Equation 4]

Here, $b_1 = \dfrac{\sum_{i=0}^{q_{in}-1} i}{q_{in}}$ and $b_2 = \dfrac{\sum_{i=0}^{q-1} i}{q}$ The present disclosure describes the case of $Q=q^2$ as Case 2, but it goes without saying that the proposed method of the present disclosure can also be applied to $Q=q^j$ (j is a natural number).

Next, it is described that power allocation and resource management methods using restriction-based Q-ary linear codes. In the present disclosure, restriction-based scalable Q-ary linear codes may be referred to as restriction-based Q-ary linear codes.

Power Allocation and Resource Management Method Using Restriction-Based Q-Ary Linear Code Hereinafter, in the present disclosure, it may be assumed that there are a total of $U$ users. At this time, the channel between each device and the server is called $u \in \{1, \ldots, U\}$ for $$h_u^{ch}$$

and can be sorted in a descending manner $$\left(\left|h_i^{ch}\right|_2 \ge \left|h_j^{ch}\right|_2 \text{ for } i < j\right).$$

Additionally, in the method proposed in the present disclosure, the systematic part can be single transmitted, and the parity part can be retransmitted.

Hereinafter, in the present disclosure, it is described power allocation and resource management methods using restriction-based Q-ary linear codes in the order of selection of the number of retransmissions, selection of device candidates to participate in learning, power allocation to each device, and resource allocation.

(1) Selection of Number of Retransmission (T)

First, the number of retransmissions T of the parity part can be determined.

The number of retransmissions T can be determined considering the available resource status. At this time, T cannot be greater than $$T_{max}^{c1} = \left(\frac{Q-1}{Q_{in}-1}\right)^2$$

when Q=prime number, and cannot be greater than $$T_{max}^{c2} = \left(\frac{q-1}{q_{in}-1}\right)^2$$

when $Q=q^2$. This means that the same reception sensitivity can be achieved by single transmission of the systematic part and some retransmission of the parity part. That is, if the parity part is transmitted in excess of the maximum number of transmissions, the same reception sensitivity cannot be achieved by single transmission of the systematic part.

(2) Selection of Device Candidates ($\mathbb{U}$) to Participate in Learning

Once T is determined, the set of users who can participate in learning among all users can be determined by Equation 5 below. Equation 5 may refer to a set of users that can achieve the reception sensitivity of a single transmission of user 1, which has the best channel among all users, by repeating T times.

$$\mathbb{U} = \{u \in \{1, \ldots, U\} \,|\, |h_1^{ch}|_2 \le T|h_u^{ch}|_2\}$$

[Equation 5]

Here, $$h_1^{ch}$$

may mean User 1's channel, channel state, or information related to channel/channel state, $$h_u^{ch}$$

may refer to the user's channel, channel state, or information related to channel/channel state, $U$ may mean the total number of users.

(3) Power Allocation of Each Device

And/or, the allocated power of each device may be determined. It can be defined as $|\mathbb{U}|=U$, and the reference channel realization $$\bar{h}_{ref}^{ch}.$$

can be called the $$|h_U^{ch}|_2.$$

For example, $$|h_U^{ch}|_2$$

may mean the $l_2$–norm of $$\overline{h}_{ref}^{ch}.$$

At this time, power allocation of the parity part can be determined by Equation 6, and power allocation of the systematic part can be determined by Equation 7.

Here, P may mean the transmission power of the worst channel user. And/or, the reference channel $$\overline{h}_{ref}^{ch}$$

may mean the worst channel user's channel, channel state, or information related to channel/channel state.

$$P_u^{par} = \left(\frac{\overline{h}_{ref}^{ch}}{|h_u^{ch}|_2}\right)^2 P \qquad \text{[Equation 6]}$$

$$P_u^{sys} = \begin{cases} \dfrac{T}{T_{max}^{c1}}\left(\dfrac{\overline{h}_{ref}^{ch}}{|h_u^{ch}|_2}\right)^2 P, \text{ if } Q \text{ is prime number,} \\ \dfrac{T}{T_{max}^{c2}}\left(\dfrac{\overline{h}_{ref}^{ch}}{|h_u^{ch}|_2}\right)^2 P, \text{ else,} \end{cases} \qquad \text{[Equation 7]}$$

(4) Resource Allocation

And/or, allocated resources may be determined. Each device can share the same resources and transmit modulated sequences of the systematic part and parity part.

At this time, the sequence of the parity part can be transmitted by repeating T times using time/frequency resources. In this case, the resource overhead ($R_{cost}$) that occurs is equal to Equation 8.

$$R_{cost} = N + (N - K)(T - 1) \qquad \text{[Equation 8]}$$

For example, in the case of an N-length codeword, the K-length systematic part is allocated to a K-length resource element, and the N–K-length parity part is transmitted repeatedly T times, so it can be allocated to T*(N–K) resource elements. Resource elements can be viewed as tones assuming orthogonal frequency division multiplexing (OFDM).

Figure 20:
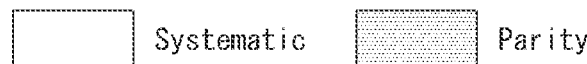
FIG. 20 illustrates an example of a resource management method.
Figure 20:
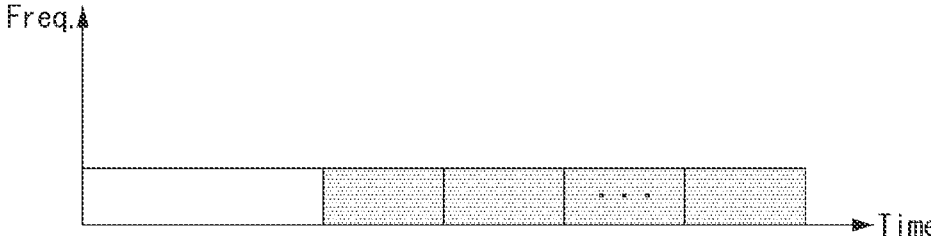
Figure 20:
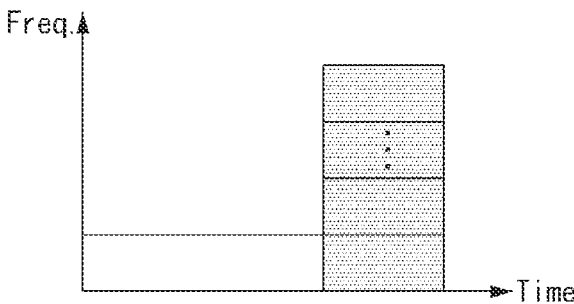
Figure 20:
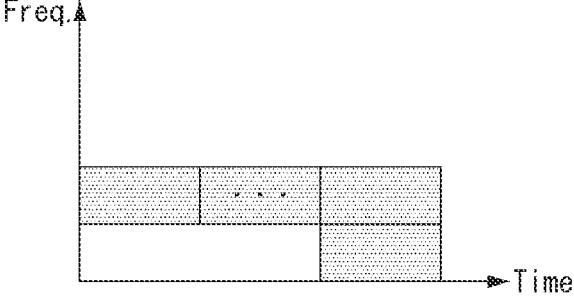

FIG. 20 illustrates an example of a resource management method. As shown in FIG. 20, it is possible to appropriately utilize time resources, frequency resources, or time and frequency resources.

Figure 21:
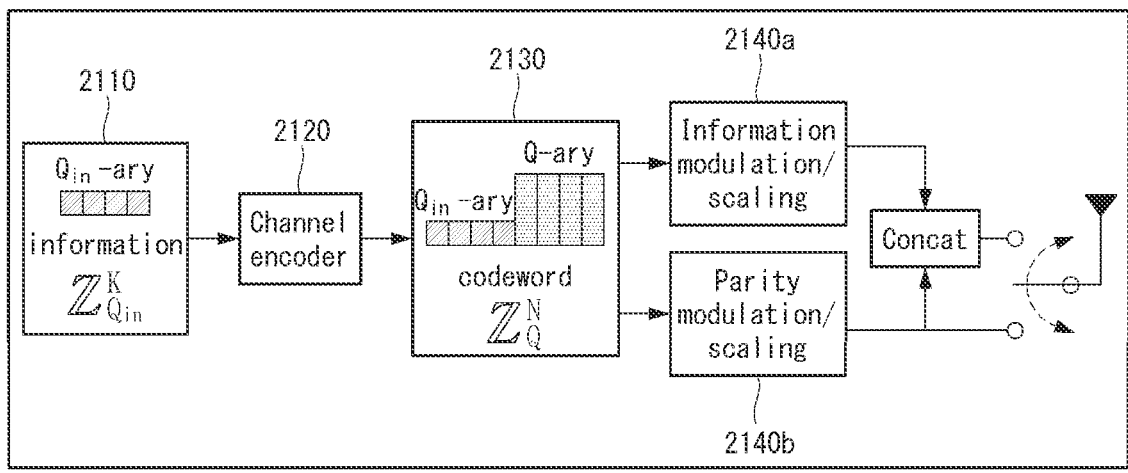
FIG. 21 is a diagram for explaining a transmission method proposed in the present disclosure.

FIG. 21 is a diagram for explaining a transmission method proposed in the present disclosure.

Referring to FIG. 21, restriction-based Q-ary information (or Qin-ary information) 2110 may be input to a channel encoder 2120, and a codeword 2130 may be output from the channel encoder 2120. Here, the coding may be systematic channel coding, and in this case, the systematic parts of the Q-ary information 2110 and the codeword 2130 are equivalent.

Next, the codeword 2130 is divided into a systematic part and a parity part and can be separately modulated and/or scaled (2140a, 2140b). Next, the modulated and/or scaled systematic part and parity part may be concatenated and transmitted together during first transmission, and from subsequent transmissions, the modulated and/or scaled parity part may be T–1-repetition transmitted.

That is, since the systematic part is single-transmitted and the parity part is T-repetition transmitted, the modulated symbol sequence of the whole codeword can be transmitted during the first transmission, and then the modulated symbol sequence of the T–1 parity part can be transmitted.

Above, it is described a proposed method applied to the transmitter, and below it is described a proposed method applied to the receiver.

(5) Receiver Pre-Processing

Before acquiring soft-values for channel decoding at the receiving end (or receiver), it is described a pre-processing method. For this purpose, the entry of the received signal $$r = [r[n]]_{n=1}^{K+T(N-K)}$$

is as shown in Equation 9.

$$r[n] = \sum_{u=1}^{U} |h_u^{ch}|_2 \sqrt{P_u^{sys}}\, s_u[n] + w[n] \qquad \text{[Equation 9]}$$

Here, w[n] may be additive white Gaussian noise (awgn noise) following CN(0,1) or N(0,1).

When the systematic part and parity part are separated, Equation 10 and Equation 11 are as follows. That is, Equation 10 represents the systematic part, and Equation 11 represents the parity part.

$$r^{sys}[n] = \sum_{u=1}^{U} |h_u^{ch}|_2 \sqrt{P_u^{sys}}\, s_u[n] + w[n] \qquad \text{[Equation 10]}$$

Where, $n = 1, \ldots, K$.

$$r_t^{par}[n] = \sum_{u=1}^{U} |h_u^{ch}|_2 \sqrt{P_u^{sys}}\, s_u[K + (t - 1)(N - K) + n] + \qquad \text{[Equation 11]}$$
$$w[K + (c - 1)(N - K) + n]$$

Where $t = 1, \ldots, T$ and $n = 1, \ldots, N - K$.

Since the parity part is transmitted T number of repetitions, $s_u[K+(t-1)(N-K)+n]=s_u[K+(t'-1)(N-K)+n]$ is satisfied for $t \in \{1, \ldots, T\} t \in \{1, \ldots, T\}\backslash\{t\}$. In other words, the parity part is transmitted repeatedly, so the same information can be transmitted/received repeatedly.

Therefore, combining the parity part gives Equation 12.

$$r^{par}[n] = \qquad \text{[Equation 12]}$$
$$\sum_{t=1}^{T} r_t^{par}[n] = T \sum_{u=1}^{U} |h_u^{ch}|_2 \sqrt{P_u^{sys}}\, s_u[K + n] + \tilde{w}[n]$$

Where, $$\tilde{w}[n] = \sum_{t=1}^{T} w[K + (t-1)(N-K) + n].$$

Because $\tilde{w}[n]$ is the sum of Gaussian random variables, it can be viewed as additive white Gaussian (awgn) noise following $CN(0, T)$ or $N(0, T)$.

To obtain soft-value values, the received signals of the systematic part and parity part can be converted as shown in Equation 13 and Equation 14. That is, for Case 1 (Q=prime number), it can be converted as shown in Equation 13, and for Case 2 (Q=$q^2$, for i$\in \mathbb{N}$, q=$p^i$, p=prime number), it can be converted as shown in Equation 14.

$$\hat{r}^{sys}[n] = \frac{r^{sys}[n]}{\bar{h}_{ref}^{ch}\sqrt{P}} + Ub_1 \text{ and } \hat{r}^{par}[n] = \frac{r^{par}[n]}{T\bar{h}_{ref}^{ch}\sqrt{P}} + Ub_2 \quad \text{[Equation 13]}$$

$$\hat{r}^{sys}[n] = \frac{r^{sys}[n]}{\bar{h}_{ref}^{ch}\sqrt{P}} + U(b_1 + jb_1) \text{ and } \hat{r}^{par}[n] = \quad \text{[Equation 14]}$$

$$\frac{r^{par}[n]}{T\bar{h}_{ref}^{ch}\sqrt{P}} + U(b_2 + jb_2)$$

A soft-value is obtained from the converted signal using the reference symbol constellation sets $\mathbb{S}_{sys}$ and $\mathbb{S}_{par}$ of Equation 15 and Equation 16, and decoding can be performed using this. For Case 1 (Q=prime number), the reference symbol constellation set is equal to Equation 15, and for Case 2 (Q=$q^2$, for i$\in \mathbb{N}$, q=$p^i$, p=prime number), the reference symbol constellation set is equal to Equation 16.

$$\mathbb{S}_{sys} = \quad \text{[Equation 15]}$$
$$\{0, 1, \ldots, (Q_{in}-1)U\} \text{ and } \mathbb{S}_{par} = \{0, 1, \ldots, (Q-1)U\}$$

$$\mathbb{S}_{sys} = \{a+jb\}_{a=0,b=0}^{U(q_{in}-1),U(q_{in}-1)} \text{ and } \mathbb{S}_{sys} = \{a+jb\}_{a=0,b=0}^{U(q-1),U(q-)} \quad \text{[Equation 16]}$$

Figure 22:
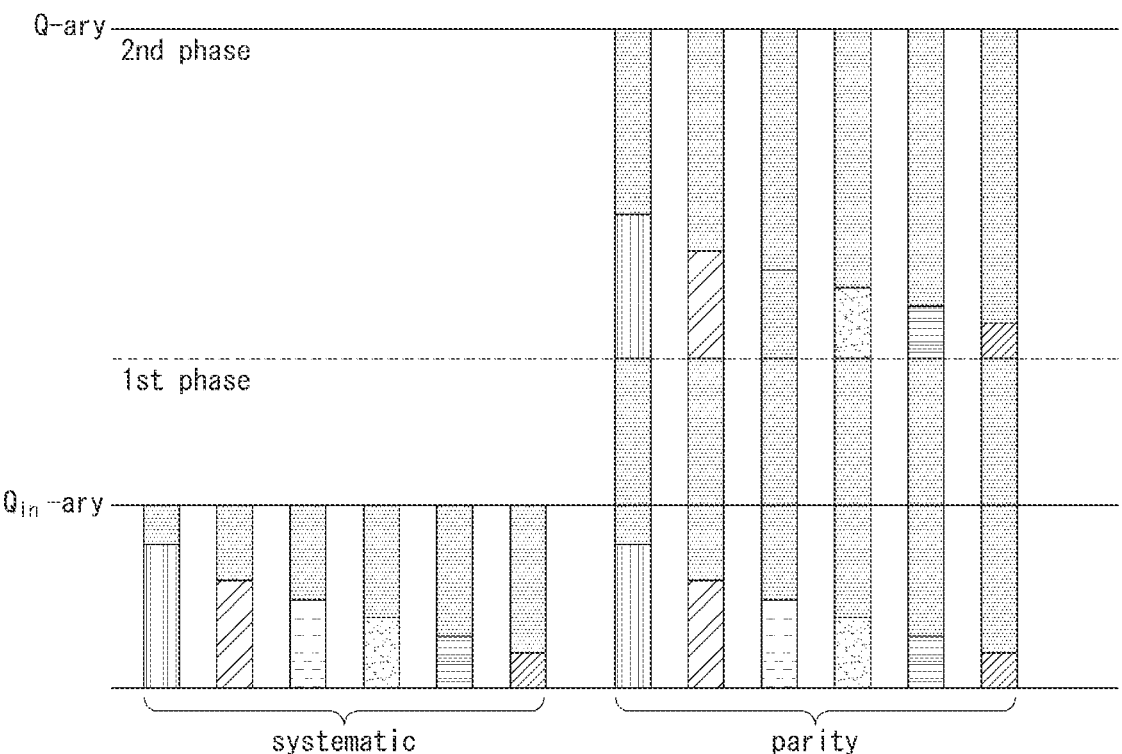
FIG. 22 is a diagram illustrating power allocation by a proposed method.

FIG. 22 is a diagram illustrating power allocation by a proposed method. FIG. 22 shows a case where the total number of users (U) is 6 and the number of repetitions (T) of the parity part is 2. Referring to FIG. 22, the bottom bar indicates the channel gain between each device and the server, and the top bar indicates the power allocated to each device.

Figure 23:
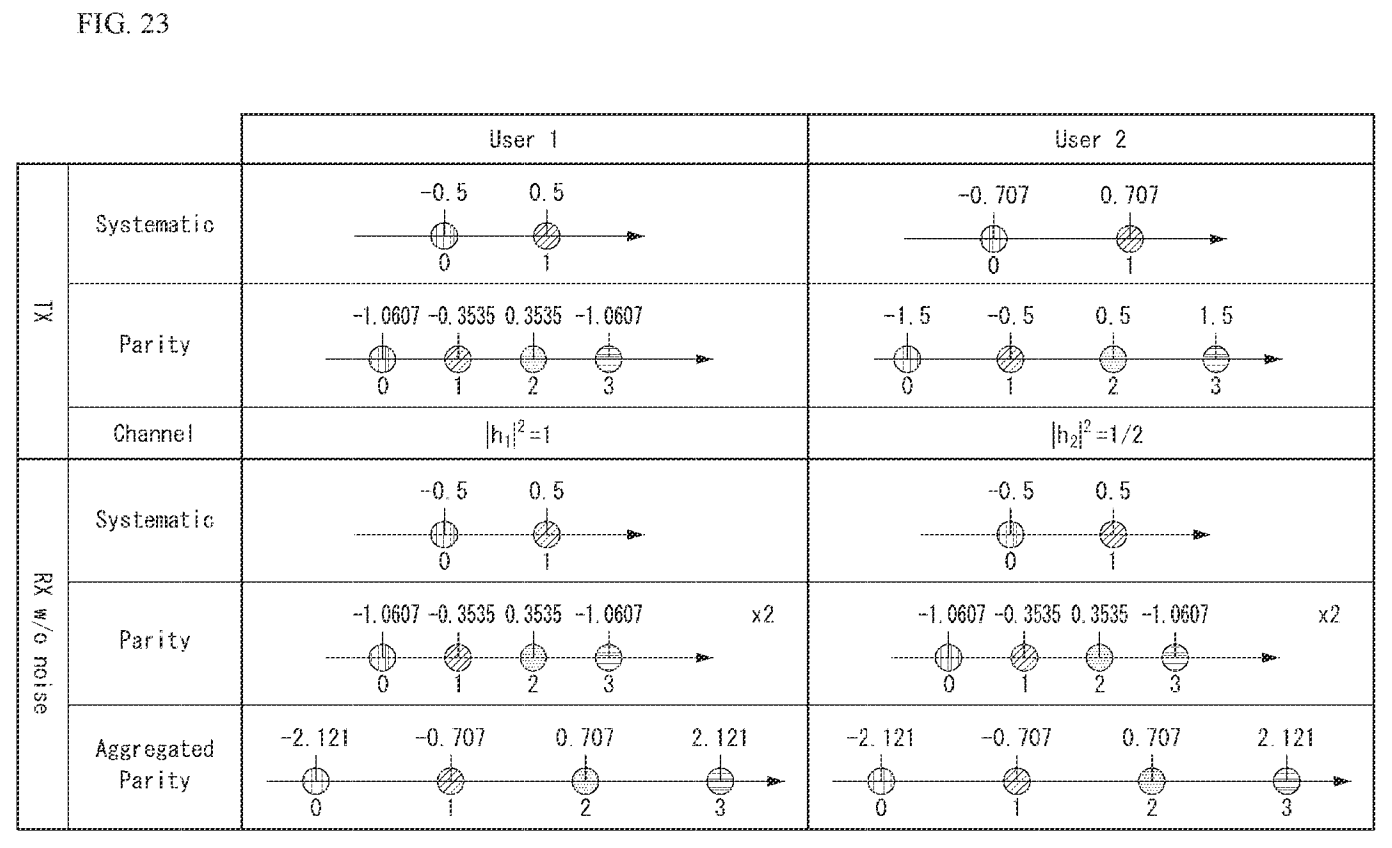

FIG. 23 is a diagram illustrating a constellation to be observed at a transmitter (transmit, Tx) and a receiver (receive, RX) at U=T=2. Referring to FIG. 23, it can be seen that the same constellation is observed on the receiver-side because power control was performed considering the channel gain difference between each device and the server.

FIG. 24 is a flowchart for explaining an operation method of a user equipment (UE) proposed in the present disclosure.

Referring to FIG. 24, first, in step S2401, the UE (100x/120 in FIG. 1, 200a/200b in FIG. 2, 400 in FIG. 4, 500 in FIG. 5) may generate a Q-any code including i) a restriction-based system part and ii) a parity part by coding restriction-based Q-ary information (or Qin-ary information). For example, restriction-based Q-ary information may mean information based on a finite field/information field with restricted order. And/or, restriction-based Q-ary information may mean information to be coded by a Q-ary linear code.

And/or, the restriction-based system part may be information with Qin-ary, and the parity part may be information with Q-ary.

In the present disclosure, "system part" may be referred to as "system part information", "information part", or "information part information", and "parity part" may be referred to as "parity part information".

The restriction-based system part and parity part can be expressed as Equation 1 or 3. In other words, the Q-ary code can be expressed as Equation 1 or 3. Alternatively, the Q-ary code may be the codeword 2130 in FIG. 21.

And/or, the system part may be modulated based on a modulation order that is different from the parity part. For example, the system part may be modulated to a lower order compared to the parity part.

Hereinafter, in S2402 to S2404, the system part means a restriction-based system part.

For example, the operation of generating a Q-ary code by the UE in step S2401 can be implemented by the device of FIGS. 1 to 5 described above. For example, referring to FIG. 2, one or more processors (200a/200b) may control one or more memories (204a/204b) and/or one or more transceivers (206a/206b) to generate a Q-ary code.

And/or, in step S2402, the UE (100x/120 in FIG. 1, 200a/200b in FIG. 2, 400 in FIG. 4, 500 in FIG. 5) may determine a number of transmissions (T) of the parity part among the Q-ary code based on a preconfigured way. And/or, the number of transmissions (T) may be determined based on available resources.

And/or, a maximum number of the transmissions of the parity part may be determined based on a Q-ary related value and a restriction-based Q-ary related value.

For example, if Q is a prime number, the maximum number of transmissions $$\left(T_{max}^{c1}\right)$$

of the parity part may be determined based on the Q-ary related value (Q) and the restriction-based related value (Qin). For example, T may be configured to be no greater than $$T_{max}^{c1} = \left(\frac{Q-1}{Q_{in}-1}\right)^2$$

if Q is prime.

For example, if Q=$q^2$, the maximum number of transmissions $$\left(T_{max}^{c2}\right)$$

of the parity part may be determined based on the Q-ary related value (q) and the restriction-based Q-ary related value (qin). For example, T may be configured to be no greater than $$T_{max}^{c2} = \left(\frac{q-1}{q_{in}-1}\right)^2 \text{ if } Q = q^2.$$

US 12,677,227 B2

35

And/or, the restriction-based Q-ary related value may be determined based on at least one of channel state and/or the number of the plurality of UEs. For example, it may be $$q_{in} = q/U \text{ and } Q_{in} = q_{in}^2.$$

For example, the preconfigured method may mean a method of determining T under the above restrictions, or may be a method of determining T by considering available resources under the above restrictions.

For example, the operation of determining the number of transmissions by the UE in step S2402 may be implemented by the device of FIGS. 1 to 5 described above. Referring to FIG. 2, one or more processors 200a/200b may control one or more memories 204a/204b and/or one or more transceivers 206a/206b to determine the number of transmissions.

And/or, in step S2403, the UE (100x/120 in FIG. 1, 200a/200b in FIG. 2, 400 in FIG. 4, 500 in FIG. 5) may allocate power to the system part and T parity parts based on specific channel information among channel information between a plurality of UEs and a base station participating in the federated learning. Here, the number of UEs and/or UEs participating in federated learning may be determined by Equation 5. And/or, the federated learning may be based on the neural network described with reference to FIGS. 10 to 16.

For example, the allocated power of the system part may be determined by Equation 7, and the allocated power of the parity part may be determined by Equation 6.

For example, channel information may be information indicating channel state. For example, specific channel information may be information about the worst channel among channels of a plurality of UEs.

For example, the operation of allocating power to T parity parts by the UE in step S2403 may be implemented by the device of FIGS. 1 to 5 described above. Referring to FIG. 2, one or more processors 200a/200b may control one or more memories 204a/204b and/or one or more transceivers 206a/206b to allocate power to T parity parts.

Figure 6:
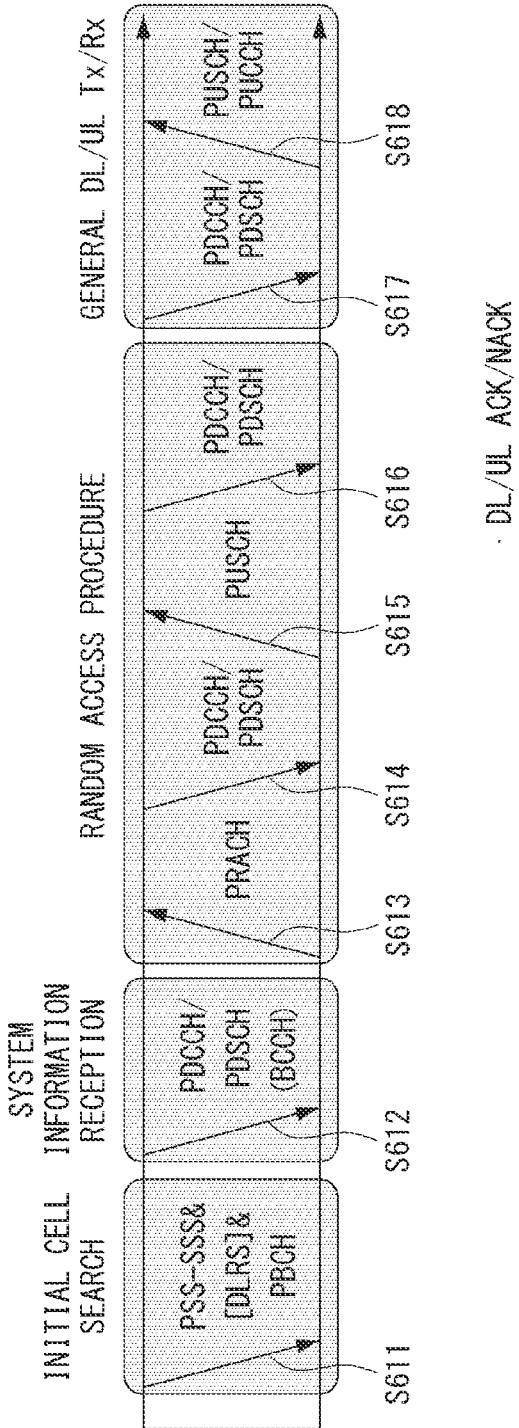
FIG. 6 is a view showing physical channels applicable to the present disclosure and a signal transmission method using the same.

And/or, in step S2404, the UE (100x/120 in FIG. 1, 200a/200b in FIG. 2, 400 in FIG. 4, 500 in FIG. 5) may transmit the system part and the T parity parts to the base station based on the allocated power For example, the UEs and the base station may perform communication based on the radio frame structure and/or slot structure of FIGS. 6 and 7.

For example, the UE may perform operations S611 to S616 or operations S611 to S618 of FIG. 6 before performing federated learning.

For example, the operation of transmitting the system part and T parity parts by the UE in step S2404 may be implemented by the device of FIGS. 1 to 5 described above. Referring to FIG. 2, one or more processors 200a/200b may control one or more memories 204a/204b and/or one or more transceivers 206a/206b to transmit the system part and T parity parts, and the one or more transceivers 206a/206b may transmit the system part and T parity parts.

And/or, the UE may receive specific channel information from the base station. At this time, the specific channel information may be information about the channel with the highest noise among channels between the plurality of UEs and the base station.

Through this, the present disclosure can efficiently use power and resources by performing power allocation and/or resource management using restriction-based scalable Q-ary linear code in AirComp-based federated learning.

Since the operation of the UE described with reference to FIG. 24 is the same as the operation of the UE described with reference to FIGS. 1 to 23, further detailed description will be omitted.

The signaling and operations described above may be implemented by a device (e.g. FIGS. 1 to 5) to be described below. For example, the signaling and operations described above may be processed by one or more processors of FIGS. 1 to 5, and the signaling and operations described above may be stored in memory in the form of instructions/programs (e.g. instruction, executable code) for driving at least one processor of FIGS. 1 to 5.

For example, a processor apparatus configured to control a user equipment (UE) to perform federated learning in a wireless communication system, the processor apparatus may comprise at least one processor, and at least one memory functionally connected to the at least one processor, and storing instructions for causing the at least one processor to perform operations, wherein the operations may include generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in the federated learning, and transmitting the system part and the T parity parts to the base station based on the allocated power.

As another example, a computer readable medium (CRM) storing instructions for causing at least one processor to perform operations, wherein the operations may include generating a Q-ary code including i) a restriction-based system part and ii) a parity part by coding restriction-based Q-ary information, determining a number of transmissions (T) of the parity part among the Q-ary code based on a preconfigured way, allocating power to the system part and T parity parts based on specific channel information among channel information between a plurality of UEs and a base station participating in federated learning, and transmitting the system part and the T parity parts to the base station based on the allocated power.

FIG. 25 is a flowchart for explaining an operation method of a base station proposed in the present disclosure.

Referring to FIG. 25, in step S2501, the base station (100x/120 in FIG. 1, 200a/200b in FIG. 2, 400 in FIG. 4, 500 in FIG. 5) may receive a system part and T parity parts from a user equipment (UE) based on allocated power, And/or, the system part and parity part may be generated by coding restriction-based Q-ary information (or Qin-ary information). For example, restriction-based Q-ary information may mean information based on a finite field/information field with restricted order. And/or, the restriction-based Q-ary information may mean information to be coded by a Q-any linear code.

And/or, the restriction-based system part may be information with Qin-ary, and the parity part may be information with Q-ary.

The restriction-based system part and parity part may be expressed as Equation 1 or 3. In other words, the Q-ary code may be expressed as Equation 1 or 3. Alternatively, the Q-ary code may be the codeword 2130 in FIG. 21.

And/or, the system part may be modulated based on a modulation order that is different from the parity part. For example, the system part may be modulated to a lower order compared to the parity part.

And/or, the number of transmissions (T) of the parity part may be determined based on a preconfigured way.

And/or, the number of transmissions (T) may be determined based on available resources.

And/or, a maximum number of transmissions of the parity part may be determined based on the Q-ary related value and the restriction-based Q-ary related value.

For example, if Q is a prime number, the maximum number of transmissions $$\left(T_{max}^{c1}\right)$$

of the parity part can be determined based on the Q-ary related value (Q) and the restriction-based Q-ary related value (Qin). For example, T may be configured to be no greater than $$T_{max}^{c1} = \left(\frac{Q-1}{Q_{in}-1}\right)^2$$

if Q is prime.

For example, if $Q=q^2$, the maximum number of transmissions $$\left(T_{max}^{c2}\right)$$

of the parity part can be determined based on the Q-ary related value (q) and the restriction-based Q-ary related value (qin). For example, T may be configured to be no greater than $$T_{max}^{c2} = \left(\frac{q-1}{q_{in}-1}\right)^2 B \text{ if } Q = q^2.$$

And/or, the restriction-based Q-ary related value may be determined based on at least one of channel state and/or the number of the plurality of UEs. For example, it may be $$q_{in} = q/U \text{ and } Q_{in} = q_{in}^2.$$

For example, the preconfigured method may mean a method of determining T under the above restrictions, and may be a method of determining T by considering available resources under the above restrictions.

The allocated power of the system part and T parity parts may be determined based on specific channel information among channel information between a plurality of UEs and a base station participating in the federated learning.

Here, the number of UEs and/or UEs participating in federated learning may be determined by Equation 5. And/or, the federated learning may be based on the neural network described with reference to FIGS. 10 to 16.

For example, the allocated power of the system part may be determined by Equation 7, and the allocated power of the parity part may be determined by Equation 6.

For example, channel information may be information indicating channel state. For example, specific channel information may be information about the worst channel among channels of the plurality of UEs.

For example, the UEs and the base station may perform communication based on the radio frame structure and/or slot structure of FIGS. 6 and 7.

For example, the base station may perform operations S611 to S616 or operations S611 to S618 of FIG. 6 before performing federated learning.

And/or, the base station may transmit specific channel information to the UE. At this time, the specific channel information may be information about the channel with the highest noise among channels between the plurality of UEs and the base station.

For example, the operation of receiving the system part and T parity parts by the base station in step S2501 can be implemented by the device of FIGS. 1 to 5 described above. Referring to FIG. 2, one or more processors 200a/200b may control one or more memories 204a/204b and/or one or more transceivers 206a/206b to receive the system part and T parity parts, and the one or more transceivers 206a/206b may receive the system part and T parity parts.

Through this, the present disclosure can efficiently use power and resources by performing power allocation and/or resource management using restriction-based scalable Q-ary linear code in AirComp-based federated learning.

Since the operation of the base station described with reference to FIG. 25 is the same as the operation of the base station described with reference to FIGS. 1 to 24, further detailed description will be omitted.

The signaling and operations described above may be implemented by a device (e.g. FIGS. 1 to 5) to be described below. For example, the signaling and operations described above may be processed by one or more processors of FIGS. 1 to 5, and the signaling and operations described above may be stored in memory in the form of instructions/programs (e.g. instruction, executable code) for driving at least one processor of FIGS. 1 to 5.

For example, a processor apparatus configured to control a user equipment (UE) to perform federated learning in a wireless communication system of the present disclosure, the processor apparatus may comprise at least one processor, and at least one memory functionally connected to the at least one processor, and storing instructions for causing the at least one processor to perform operations, wherein the operations may include receiving a system part and T parity parts from a user equipment (UE) based on allocated power, wherein the system part and parity parts are generated by coding restriction-based Q-ary information, wherein a number of transmissions (T) of the parity part is determined based on a preconfigured way, and wherein the allocated power of the system part and T parity parts is determined based on specific channel information among channel information between a plurality of UEs and a base station participating in the federated learning.

As another example, a computer readable medium (CRM) storing instructions for causing at least one processor to perform operations, wherein the operations may include receiving a system part and T parity parts from a user equipment (UE) based on allocated power, wherein the system part and parity parts are generated by coding restriction-based Q-ary information, wherein a number of transmissions (T) of the parity part is determined based on a preconfigured way, and wherein the allocated power of the system part and T parity parts is determined based on specific channel information among channel information between a plurality of UEs and a base station participating in the federated learning.

Here, wireless communication technology implemented in the wireless devices 200a and 200b of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB, and/or LTE Cat NB2, and is not limited to the name described above. Additionally or alternatively, the wireless communication technology implemented in the wireless devices of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 200a and 200b of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs). Digital Signal Processing Devices (DSPDs). Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for performing federated learning in the wireless communication system of the present disclosure has been explained focusing on examples applied to the 3GPP LTE/LTE-A system, 5G system (New RAT system), and 6G/Beyond 6G system, but in addition, it is possible to apply it to various wireless communication systems.

The invention claimed is:

1. A method for performing federated learning in a wireless communication system, the method performed by a user equipment (UE) comprising:
   generating a Q-ary code including i) a restriction-based system part and ii) a parity part by coding restriction-based Q-ary information;
   determining a number of transmissions (T) of the parity part among the Q-ary code based on a preconfigured way;
   allocating power to the system part and T parity parts based on specific channel information among channel information between a plurality of UEs and a base station participating in the federated learning; and
   transmitting the system part and the T parity parts to the base station based on the allocated power.

2. The method of claim 1, wherein the number of transmissions (T) is determined based on available resources.

3. The method of claim 1, wherein a maximum number of the transmissions of the parity part is determined based on a Q-ary related value and a restriction-based Q-ary related value.

4. The method of claim 3, wherein the restriction-based Q-ary related value is determined based on at least one of channel state and/or a number of the plurality of UEs.

5. The method of claim 1, wherein the system part is modulated based on a modulation order different from the parity part.

6. The method of claim 1, further comprising:
   receiving the specific channel information from the base station,
   wherein the specific channel information is information about a channel with highest noise among channels between the plurality of UEs and the base station.

7. A user equipment (UE) configured to perform federated learning in a wireless communication system, the UE comprising:
   at least one transceiver;
   at least one processor functionally connected to the at least one transceiver; and
   at least one memory functionally connected to the at least one processor, and storing instructions for causing the at least one processor to perform operations,
   wherein the operations includes:
   generating a Q-ary code including i) a restriction-based system part and ii) a parity part by coding restriction-based Q-ary information;

determining a number of transmissions (T) of the parity part among the Q-ary code based on a preconfigured way;

allocating power to the system part and T parity parts based on specific channel information among channel information between a plurality of UEs and a base station participating in the federated learning; and transmitting the system part and the T parity parts to the base station based on the allocated power.

8. A method for performing federated learning in a wireless communication system, the method performed by a base station comprising:

receiving a system part and T parity parts from a user equipment (UE) based on allocated power, wherein the system part and parity parts are generated by coding restriction-based Q-ary information, wherein a number of transmissions (T) of the parity part is determined based on a preconfigured way, and wherein the allocated power of the system part and T parity parts is determined based on specific channel information among channel information between a plurality of UEs and a base station participating in the federated learning.

9. The method of claim 8, wherein the number of transmissions (T) is determined based on available resources.

10. The method of claim 8, wherein a maximum number of the transmissions of the parity part is determined based on a Q-ary related value and a restriction-based Q-ary related value.

11. The method of claim 10, wherein the restriction-based Q-ary related value is determined based on at least one of channel state and/or a number of the plurality of UEs.

12. The method of claim 8, wherein the system part is modulated based on a modulation order different from the parity part.

13. The method of claim 8, further comprising:

transmitting the specific channel information to the UE, wherein the specific channel information is information about a channel with highest noise among channels between the plurality of UEs and the base station.

*    *    *    *    *